United States Patent [19]
Cai et al.

[11] Patent Number: 6,029,228
[45] Date of Patent: Feb. 22, 2000

[54] DATA PREFETCHING OF A LOAD TARGET BUFFER FOR POST-BRANCH INSTRUCTIONS BASED ON PAST PREDICTION ACCURACY'S OF BRANCH PREDICTIONS

[75] Inventors: George Z. N. Cai; Jonathan H. Shiell, both of Plano, Tex.

[73] Assignee: Texas Instruments Incorporated, Dallas, Tex.

[21] Appl. No.: 08/999,440

[22] Filed: Dec. 29, 1997

Related U.S. Application Data

[60] Provisional application No. 60/034,827, Dec. 31, 1996.
[51] Int. Cl.[7] ........................................... G06F 9/38
[52] U.S. Cl. .................... 711/137; 711/213; 712/225; 712/239
[58] Field of Search .................... 711/137, 213; 712/239, 225

[56] References Cited

U.S. PATENT DOCUMENTS

| | | | |
|---|---|---|---|
| 5,377,336 | 12/1994 | Eickemeyer et al. | 712/207 |
| 5,778,435 | 7/1998 | Berenbaum et al. | 711/137 |
| 5,822,790 | 10/1998 | Mehrotra | 711/213 |
| 5,928,358 | 7/1999 | Takayama et al. | 712/239 |

*Primary Examiner*—Kenneth S. Kim
*Attorney, Agent, or Firm*—Rebecca Mapstone Lake; Richard L. Donaldson

[57] ABSTRACT

A method of operating a microprocessor (12). The method first receives (64) a plurality of instructions arranged in a sequence from a first instruction through a last instruction. The method second identifies (66) a branch instruction as one of the plurality of instructions, wherein the branch instruction has a target instruction address. The method third determines two factors for the branch instruction, the first being a prediction value (72) indicating whether or not program flow should pass to the target instruction address, and the second being an accuracy measure (74, 76) indicating accuracy of past ones of the prediction value. The method fourth identifies a data fetching instruction following the branch instruction in the plurality of instructions. Lastly, the method issues a prefetch request (70, 78) for the data fetching instruction in response to the accuracy measure.

36 Claims, 5 Drawing Sheets

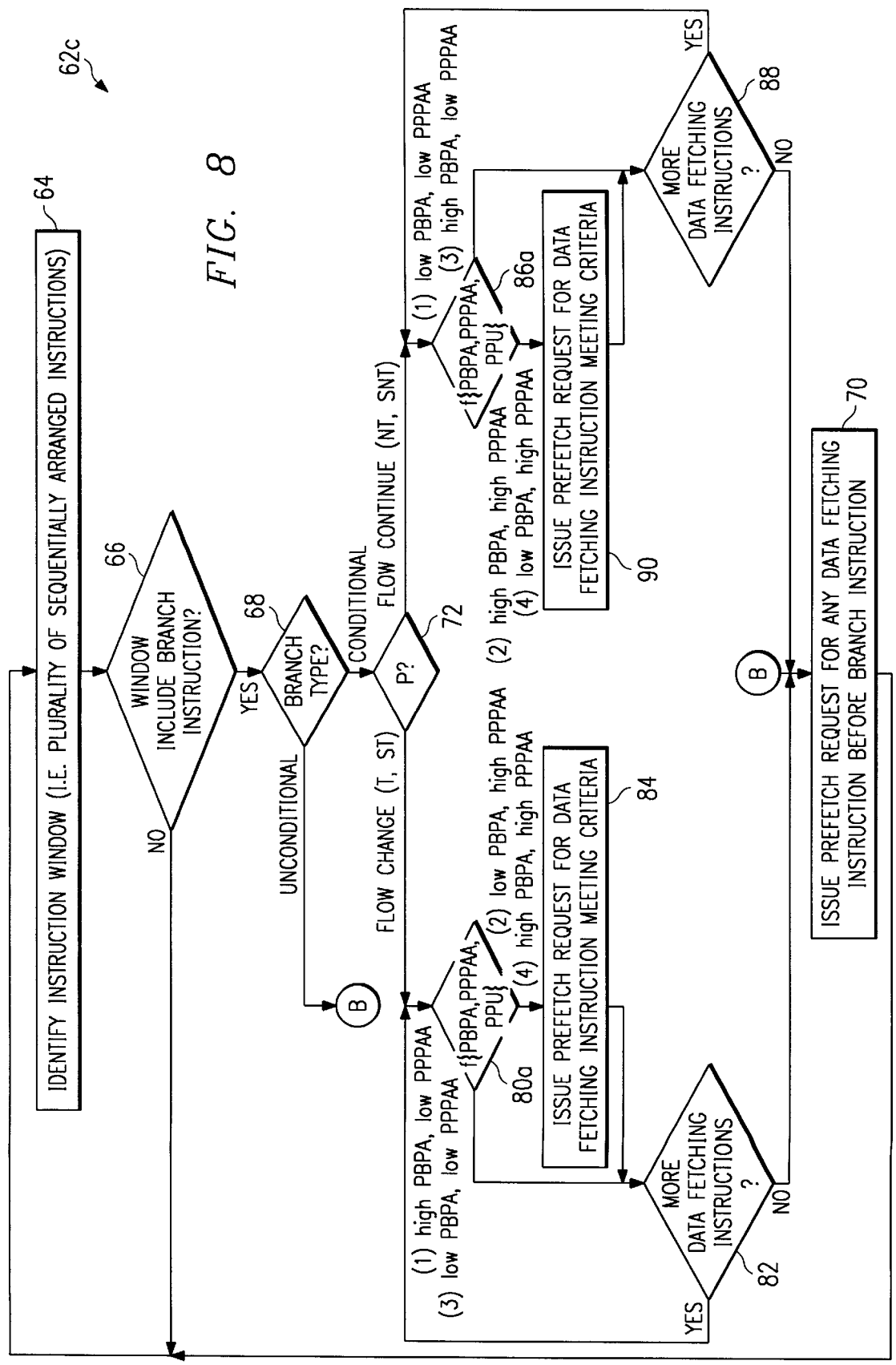

DATA PREFETCHING OF A LOAD TARGET BUFFER FOR POST-BRANCH INSTRUCTIONS BASED ON PAST PREDICTION ACCURACY'S OF BRANCH PREDICTIONS

This application claims priority under 35 USC 119 (e) (1) of provisional application number 60/034,827, filed Dec. 31, 1996.

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present embodiments relate to microprocessor systems, and are more particularly directed to circuits, systems and methods for data prefetching based on weighted considerations from both a branch target buffer and a load target buffer.

Microprocessor technology continues to advance at a rapid pace, with consideration given to all aspects of design. Designers constantly strive to increase performance, while maximizing efficiency. With respect to performance, greater overall microprocessor speed is achieved by improving the speed of various related and unrelated microprocessor circuits and operations. For example, one area in which operational efficiency is improved is by providing parallel and out-of-order instruction execution. As another example, operational efficiency also is improved by providing faster and greater access to information, with such information including instructions and/or data. The present embodiments are primarily directed at this access capability and, more particularly, to improving access to data by way of prefetching such data.

One common technique used in modem microprocessors to improve performance involves the "pipelining" of instructions. As is well known in the art, microprocessor instructions each generally involve several sequential operations, such as instruction fetch, instruction decode, retrieval of operands from registers or memory, execution of the instruction, and writeback of the results of the instruction. Pipelining of instructions in a microprocessor refers to the staging of a sequence of instructions so that multiple instructions in the sequence are simultaneously processed at different stages in the internal sequence. For example, if a pipelined microprocessor is executing instruction n in a given microprocessor clock cycle, a four-stage pipelined microprocessor may simultaneously (i.e., in the same machine cycle) retrieve the operands for instruction n+1 (i.e., the next instruction in the sequence), decode instruction n+2, and fetch instruction n+3. Through the use of pipelining, the performance of the microprocessor can effectively execute a sequence of multiple-cycle instructions at a rate of one per clock cycle.

Through the use of both pipelining and superscalar techniques, modem microprocessors may execute multi-cycle machine instructions at a rate greater than one instruction per machine clock cycle, assuming that the instructions proceed in a known sequence. However, as is well known in the art, many computer programs do not continuously proceed in the sequential order of the instructions, but instead include branches (both conditional and unconditional) to program instructions that are not in the current sequence. Such operations challenge the pipelined microprocessor because an instruction in the pipeline may not necessarily reach execution. For example, a conditional branch instruction may, upon execution, cause a branch to an instruction other than the next sequential instruction currently in the pipeline. In this event, the instructions currently in the pipeline and following the branch instruction are not used. Instead, these successive instructions are "flushed" from the pipeline and the actual next instruction (i.e., the target of the branch) is fetched and processed through the pipeline (e.g., by decoding, execution, writeback and the like).

In order to minimize microprocessor performance reduction which results from non-sequential program execution, many modem microprocessors incorporate speculative execution based upon branch prediction. Branch prediction predicts, on a statistical basis, the results of each conditional branch (i.e., whether the branch will be "taken" or "not-taken"), and the microprocessor continues fetching instructions and operating the pipeline based on the prediction. For example, if a branch instruction is predicted not taken, then the next instruction fetched into the pipeline is simply the next sequential instruction following the branch instruction. On the other hand, if a branch instruction is predicted taken, then the next instruction fetched into the pipeline is the target instruction (i.e., the instruction to which the branch goes if taken). The instructions fetched based upon such a prediction proceed along the pipeline until the actual result of the condition is determined (typically upon execution of the branch instruction). If the prediction is correct, the speculative execution of the predicted instructions maintains the microprocessor at its highest performance level through full utilization of the pipeline. In the event that the prediction is incorrect, the pipeline is flushed to remove all instructions following the branch instruction in the pipeline.

By way of further background, conventional speculative execution techniques include the use of branch target buffers (BTBs). Conventional BTBs are cache-like buffers commonly used in the fetch units of microprocessors. The BTB commonly stores at least three items: (1) an identifier of a previously performed branch instruction as a tag; (2) the predicted target address for the branch (i.e., the address to which the branch points in its predicted taken state); and (3) an indication relating to the branch's actual history, that is, whether or not the branch was taken in past occurrences of the branch. The indication relating to the branch's actual history either directly indicates a prediction, or is used to derive a prediction, of whether the branch is taken. Once a BTB entry is written to include this information for a given branch, subsequent fetches of the same branch are handled using this very information. Specifically, if the branch is predicted taken (based on the branch history), the target address is used as the next address to fetch in the pipeline. The history section of the BTB entry is also updated upon execution of the branch instruction. Specifically, the execution unit determines the actual target address for the branch instruction to determine whether or not the branch is taken. This information updates the history in the BTB entry and, therefore, affects the future prediction for that entry. Note also that the actual target address from the execution unit is also compared to the predicted address; if the two do not match, a misprediction has occurred and the instruction unit is so informed so that the pipeline may be flushed and begin fetching new instructions beginning at the actual address.

Another very common approach in modem computer systems directed at improving access time to information is to include one or more levels of cache memory within the system. For example, a cache memory may be formed directly on a microprocessor, and/or a microprocessor may have access to an external cache memory. Typically, the lowest level cache (i.e., the first to be accessed) is smaller and faster than the cache or caches above it in the hierarchy, and the number of caches in a given memory hierarchy may vary. In any event, when utilizing the cache hierarchy, when an information address is issued, the address is typically directed to the lowest level cache to see if that cache stores information corresponding to that address, that is, whether there is a "hit" in that cache. If a hit occurs, then the addressed information is retrieved from the cache without having to access a memory higher in the memory hierarchy, where that higher ordered memory is likely slower to access than the hit cache memory. On the other hand, if a cache hit does not occur, then it is said that a cache miss occurs. In response, the next higher ordered memory structure is then presented with the address at issue. If this next higher ordered memory structure is another cache, then once again a hit or miss may occur. If misses occur at each cache, then eventually the process reaches the highest ordered memory structure in the system, at which point the addressed information may be retrieved from that memory.

Still another prior art technique for increasing speed involves the prefetching of information in combination with cache systems. Prefetching involves a speculative retrieval, or preparation to retrieve, information, where the information is retrieved from a higher level memory system, such as an external memory, into a cache under the expectation that the retrieved information may be needed by the microprocessor for an anticipated event at some point after the next successive clock cycle. In this regard, the instance of a load is perhaps more often thought of in connection with retrieval, but note that prefetching may also concern a data store as well. More specifically, a load occurs where a specific data is retrieved so that the retrieved data may be used by the microprocessor. However, a store operation often first retrieves a group of data, where a part of that group will be overwritten. Still further, some store operations, such as a store interrogate, do not actually retrieve data, but prepare some resource external from the microprocessor for an upcoming event which will store information to that resource. Each of these cases, for purposes of this Background and the present embodiments to follow, should be considered a type of prefetch. In any event, in the case of prefetching where data is speculatively retrieved into an on-chip cache, if the anticipated event giving rise to the prefetch actually occurs, the prefetched information is already available in the cache and, therefore, may be fetched from the cache without having to seek it from a higher ordered memory system. In other words, prefetching lowers the risk of a cache miss once an actual fetch is necessary.

Given the above techniques, the present inventors provide within a microprocessor still additional circuits, systems, and methods, where various embodiments further advance operational efficiency in view of the above considerations as well as others which may be ascertained by one skilled in the art.

BRIEF SUMMARY OF THE INVENTION

In one embodiment there is a method of operating a microprocessor. The method first receives a plurality of instructions arranged in a sequence from a first instruction through a last instruction. The method second identifies a branch instruction as one of the plurality of instructions, wherein the branch instruction has a target instruction address. The method third determines two factors for the branch instruction, the first being a prediction value indicating whether or not program flow should pass to the target instruction address, and the second being an accuracy measure indicating accuracy of past ones of the prediction value. The method fourth identifies a data fetching instruction following the branch instruction in the plurality of instructions. Lastly, the method issues a prefetch request for the data fetching instruction in response to the accuracy measure. Other circuits, systems, and methods are also disclosed and claimed.

BRIEF DESCRIPTION OF THE SEVERAL VIEWS OF THE DRAWING

FIG. 8 illustrates a flow chart of a third method embodiment for the circuits of FIG. 4, where the third method embodiment issues prefetch requests for data fetching instructions based on a function combining a confidence measure of the branch prediction a confidence measure of the predicted target data address, and a measure of the usefulness of a prefetch request.

DETAILED DESCRIPTION OF THE INVENTION

Figure 1:
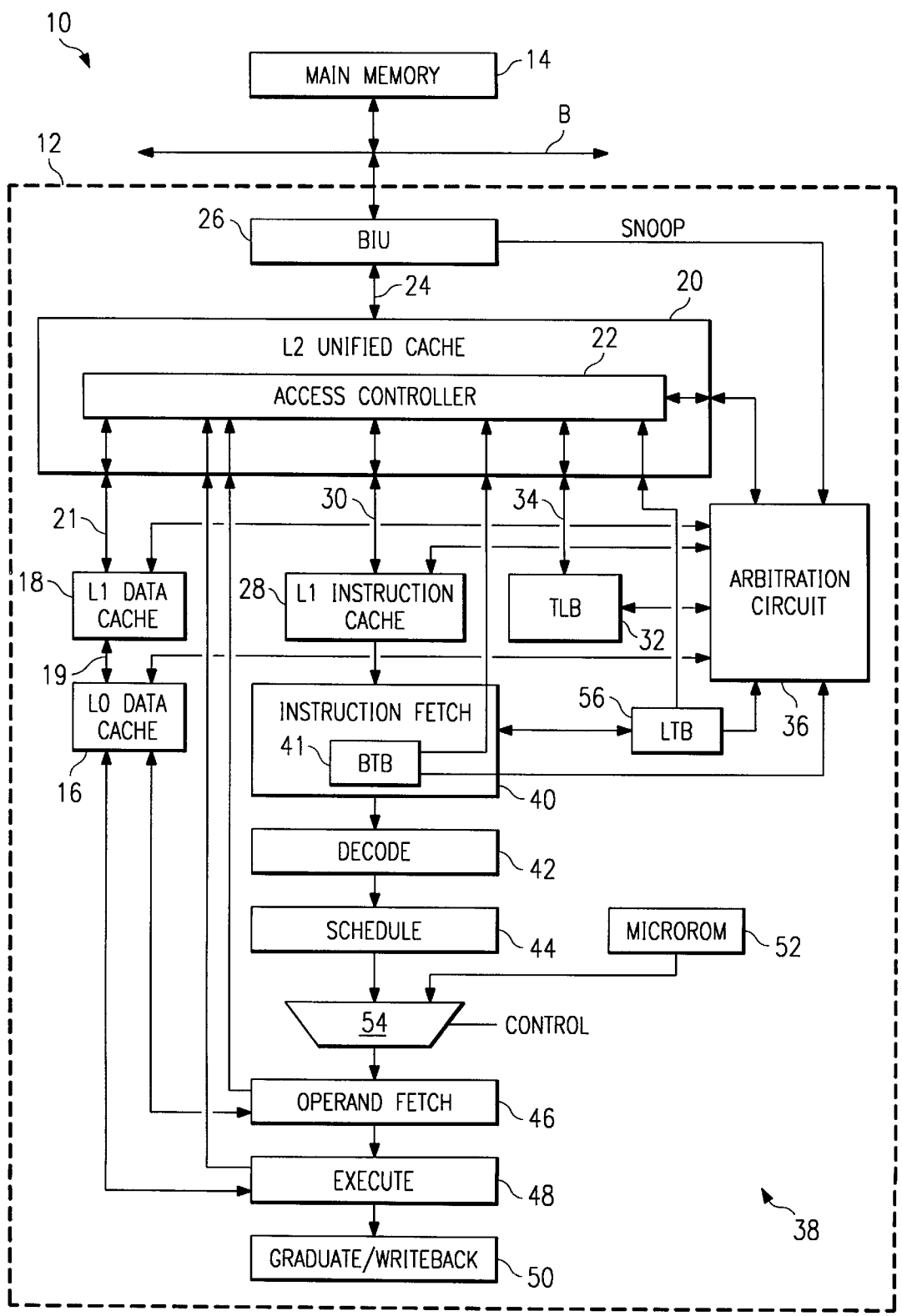
FIG. 1 illustrates an electrical diagram of a microprocessor having a multiple level memory system with various components for both fetching and prefetching information from that system.

FIG. 1 illustrates a block diagram of a microprocessor based system designated generally at 10 and in accordance with the present embodiments. System 10 includes a microprocessor 12 which has a bus B, and which may connect to various external devices. However, for purposes of providing a context for the present embodiments, only an external memory 14 is shown connected to bus B, with additional items known in the art. Note also that microprocessor 12 may represent various different types of microprocessor structures, and numerous such structures are either known to, or ascertainable by, one skilled in the art. At this point, however, the details related to such a microprocessor other than in connection with the components of FIG. 1 are neither shown nor explained in order to simplify the present discussion.

Turning to the blocks shown in FIG. 1, microprocessor 12 includes a memory hierarchy in a manner known in the art, that is, a hierarchy which reads and writes data starting from a lowest ordered storage system toward higher ordered storage systems. At the lowest level of such a system is a zero level data cache circuit, shown in FIG. 1 as L0 data cache 16. The "L0" indication demonstrates the matter of memory hierarchy as is known in the art Specifically, cache circuits with a lower numerical designation are commonly closer to the execution unit of the microprocessor pipeline (described below) as compared to cache circuits with a higher numerical designation, such as the L1 and L2 data cache circuits discussed later. Moreover, the numerical designation of the cache provides an ascending indication of the order in which the caches are typically accessed when either reading from, or writing to, the caches. Thus, such an access first occurs to an L0 cache and, if a cache miss occurs to that cache, it is followed by an access to an L1 cache, and so forth through the memory hierarchy until a hit is found in either a cache or other memory structure. Returning to L0 data cache 16, in the present embodiment it is preferably a 4-way set associative cache operable to store a total of 1 Kbytes of data in 16 byte blocks, and with each way operable to output 64 bits (i.e., 8 bytes) at a time.

Microprocessor 12 further includes an L1 data cache 18, and which is connected to L0 data cache 16 via a bus 19. Again, the "L1" designation necessarily indicates that this cache is higher in the memory hierarchy as compared to L0 data cache 16. In the preferred embodiment, L1 data cache 18 is preferably a 2-way set associative cache operable to store a total of 8 Kbytes of data in 32 byte blocks, and with each way operable to output 128 bits (i.e., 16 bytes) at a time.

System 10 further includes an L2 unified cache 20, and which is connected to L1 data cache 18 via a bus 21. In the preferred embodiment, L2 unified cache 20 is preferably a 4-way set associative cache operable to store a total of 64 Kbytes of data in 64 byte blocks with 32 byte sub-blocks, and with each way operable to output 256 bits (i.e., 32 bytes) at a time. Note that the L2 cache is referred to as a unified cache, meaning in addition to storing data it stores other information as well. Specifically, as shown below, L2 unified cache 20 further stores instructions as well as address translation information. Note that in an alternative embodiment, however, the type or types of information stored may vary. In any event, with respect to data note then the memory hierarchy formed, that is, from L0 data cache 16, to L1 data cache 18, to L2 unified cache 20. Therefore, a first source giving rise to a potential addressing of L2 unified cache 20 is L1 data cache 18 in response to a miss in L1 data cache 18, which in turn arose from a miss in L0 data cache 16. Moreover, in each fetch instance causing a cache miss, data is sought at the next higher level of this hierarchy; thus, if a miss occurs at L2 unified cache 20, then the data is addressed from external memory 14. Note also that L2 unified cache 20 further includes an access controller 22. Access controller 22 receives requests to access L2 unified cache 20, where those requests may be either for fetching or prefetching information from L2 unified cache 20.

Before discussing the other information paths shown in FIG. 1 relating to L2 unified cache 20, and completing the illustration of FIG. 1 in an upward sense toward bus B, note that L2 unified cache 20 is further connected by way of a bus 24 to a bus interface unit ("BIU") 26, and BIU 26 is connected to bus B. As suggested above, bus B permits external access from microprocessor 12 and, therefore, may control and perform communication between microprocessor 12 and other elements external from the microprocessor, including external memory 14 which one skilled in the art will appreciate is higher in the memory hierarchy than L2 unified cache 20 (and, of course, also higher than L1 data cache 18 and L0 data cache 16 as well). As another example, note that an external cache may be connected between bus B and main memory 14 and, thus, microprocessor 12 could communicate with such an external cache. As still another example, note that microprocessor 12 may communicate with other microprocessors in a multiple microprocessor system, such as communicating with the on-chip memory or memories of those other microprocessors. In any event, these external devices are by way of example and, at this point, any additional elements external from microprocessor 12 are not detailed for sake of simplicity, with examples of such elements known or ascertainable by one skilled in the art As mentioned above, L2 unified cache 20 also stores instructions. In this regard, a second source giving rise to a potential addressing of L2 unified cache 20 is L1 instruction cache 28. Specifically, L1 instruction cache 28 is connected via a bus 30 to L2 unified cache 20. As its name implies, L1 instruction cache 28 stores instructions (as opposed to data as is stored in L1 data cache 18). I n the preferred embodiment, L1 instruction cache 28 is constructed and sized in the same manner as L1 data cache 18 and, therefore, is preferably a 2-way set associative cache operable to store a total of 8 Kbytes of information; here, the information is instructions in 32 byte blocks, and each way is operable to output 128 instruction bits (i.e., 16 bytes) at a time.

A third source giving rise to a potential addressing of L2 unified cache 20 is a translation lookaside buffer ("TLB") 32. Specfically, TLB 32 is connected via a bus 34 to L2 unified cache 20. In the preferred embodiment, as is common in the microprocessor art, logical instruction addresses are translated to corresponding physical addresses. In this context, TLB 32 stores a table of some of the existing translations so that such translations may be accessed at subsequent times without having to re-calculate the translation. In addition, if there is a miss in the look up to TLB 32, then hardware associated with TLB 32 begins a table walk through page tables in main memory to determine the address translation. These main memory page tables also may be stored, in part or whole, in the L2 unified cache 20. In the preferred embodiment, TLB 32 is preferably 256 entries, Sway set associative, and sized such that each line stores a single translation.

Having noted the different levels of caches in FIG. 1, note further that each such cache is also connected to an arbitration circuit 36. Arbitration circuit 36 is included to demonstrate the general functionality of successive accesses to each cache based on a miss of a lower cache. For example, as mentioned above, if a cache access to L0 data cache 16 results in a cache miss, then L1 data cache 18 is accessed, followed by L2 unified cache 20, and so forth. Arbitration circuit 36, therefore, represents an arbitration control over this functionality, and may be implemented in various fashions by a person skilled in the art. Note further, however, that the inclusion of arbitration circuit 36 is not intended to impose any serialization of operation among the various caches of microprocessor 10, that is, each cache is still able to service requests and otherwise operate independent of the others. Note also that arbitration circuit 36 also connects to access controller 22 of L2 unified cache 20. Thus, when an access request is to be presented to L2 unified cache 20 based on a miss of a lower-level cache, then arbitration circuit 36 presents this access request to access controller 22.

A fourth source giving rise to a potential addressing of L2 unified cache 20 is any circuit providing a snoop request to L2 unified cache 20. As is known in the art, snooping is a function which ensures memory coherency through different levels in a memory hierarchy. The snoop request may be generated either internally or externally from the microprocessor. Typically, a snoop occurs by presenting an address to one or more levels of the memory system. In FIG. 1, this functionality is shown by way of a snoop address input from BIU 26 to arbitration circuit 36 which, in turn, may present the snoop address to any of the cache structures of FIG. 1. Each cache may be directed to respond in various manners to the snoop address depending on factors known in the art such as the coherency protocol being implemented. For example, the cache may be directed to merely confirm whether it stores information corresponding to the snoop address. As another example, the cache may be directed to output the information corresponding to the snoop address if it has such information. As yet another example, the cache may be directed to invalidate the information corresponding to the snoop address if it has such information. In any event, the snoop address poses yet another potential address to L2 unified cache 20.

Having presented the various components of the addressable memory hierarchy of microprocessor 12, reference is now turned to the components of the microprocessor which may require the addressable information from the memory hierarchy. In this regard, microprocessor 12 includes a pipeline designated generally at 38 and which may used to receive and process instructions in a complex instruction set computer ("CISC"). Pipeline 38 is shown by way of example as having six stages evenly numbered 40 through 50. Each of stages 40 through 50 is in some respects representative of a stage or stages known in the art, and may differ in name and/or function in different architectures. Thus, the following discussion is by way of example and without limitation to the inventive embodiments. Turning to pipeline 38, note generally that an instruction is retrieved at a beginning stage which in the present example is an instruction fetch stage 40. Instruction fetch stage 40 includes a branch target buffer ("BTB") 41 which may assist in instruction fetching in the context of branch instructions as known in the art. Instruction fetching by stage 40 occurs at a first level from L1 instruction cache 28 described above, but also may occur from various other resources such as caches and various levels of memory. Instruction fetching also may include address manipulation such as translation between a logical address and a physical address. In any event, note also that some instruction fetches may stall the pipeline more than one clock cycle, particularly to access slower components of the memory hierarchy system. Typically, the received instruction is thereafter decoded in one or more decoding stages 42. While a pipeline may therefore include an integer number of decode stages, pipeline 38 includes only one such decode stage 42 by way of example, with it understood that typically the decode process is a multi-stage (i.e., multiple dock) process. The decode stage 42 (or stages) decompresses the more complicated instruction into one or more simple operations referred to in this document as micro-operation codes. These micro-operation codes typically may be executed in a single execution clock. Note also that micro-operation codes have different names depending on the architecture and/or manufacturer. For example, in the Texas Instruments' standard, micro-operation codes are referred to as atomic operations ("AOps"). These AOps, if completed in their entirety, represent completion and graduation of the instruction set instruction, including its opcode and operands if applicable. Note that AOps are approximately comparable to some RISC instructions and, thus, are the codes which are connected to various portions of the microprocessor to subsequently initiate execution of the decoded instruction. Thus, AOps are comparable to what is referred to in other architectures as ROps, μOps, or RISC86 instructions.

After the micro-operation codes are generated from decode stage 42, schedule stage 44 schedules those codes to the corresponding appropriate execution units of the microprocessor. In some conventions, the scheduling stage is referred to as the issuing of each micro-operation code to its execution unit. For example, if a microprocessor includes three execution units (e.g., an arithmetic unit, a load/store unit, and a floating point unit), then a group of up to three micro-operation codes may be formed and assigned for execution in a single clock cycle by each corresponding execution unit. Indeed, a microprocessor may include more than three execution units, such as by having more than one arithmetic unit and more than one load/store unit. In such an event, the number of micro-operation codes to be executed in a single clock cycle may be increased accordingly. For purposes of a referring term to use in this document, the group of micro-operation codes, regardless of its size, is referred to as a "machine word." It is not uncommon for such a machine word to require 50 or more bits per execution resource and, therefore, a microprocessor with three execution units may operate in response to a machine word on the order of 150 bits in width.

Before discussing the stage following schedule stage 44, note further that machine words may come from a different source as an alternative to that described above, namely, from a microprogram memory 52 which often is referred to in the art as a microROM. Microprogram memory 52 is commonly a read only memory which is pre-programmed with various threads of machine words. The output of microprogram memory 52 is connected as an input to a multiplexer 54 as is the output of schedule stage 44. Consequently, multiplexer 54 may, in response to various control signals which need not be detailed here, provide a machine word from microprogram memory 52 to the next successive stage rather than a machine word from schedule stage 44. More specifically, an entry point address may be generated to microprogram memory 52 in which case the first machine word in such a thread is output, and then during each successive clock cycle a successive machine word in the thread may be output. Thus, by repeating this process, one of the entire threads from microprogram memory 52 is passed to the remainder of pipeline 38, which may then execute and complete each of the machine words in the microprogram memory thread.

After multiplexer 54, operand fetch stage 46 fetches any data necessary to execute any one or more of the micro-operation codes in the currently issued machine word. Typically, this data includes operands fetched from either registers or memory. In the context of retrieving data from memory, note that stage 46 is connected to L0 data cache 16 to seek data from that cache. Again, if a miss occurs at that cache level, one skilled in the art will therefore appreciate that the data may then be sought from a higher level, such as L1 data cache 18, L2 unified cache 20, or external memory 14. Note that like instruction fetches, some data fetches also may stall the pipeline more than one clock cycle.

Execution stage 48 includes numerous execution units, such as one or more arithmetic logic units, one or more load/store units, and a floating point unit. For each such unit, the unit executes its corresponding part of the machine word, that is, each execution unit performs its corresponding function on its assigned micro-operation code. Note also that one or more execution units of execution stage 48 also may access data and, therefore, stage 48 is also connected to L0 data cache 16 and, by that connection, has access to that cache as well as to the additional data storage structures higher than that cache in the memory hierarchy of microprocessor 12.

Lastly, stage 50 graduates the instruction, meaning it is allowed to complete and take its effect, if any, on the architected state of the microprocessor. In addition, the result of the instruction, if any, may be written to some store such as a register file. This last operation is commonly referred to as writeback, and sometimes is considered a function which is not part of the final pipeline stage, but which occurs at the same time the instruction is graduated.

Given the discussion presented thus far, one skilled in the art will appreciate that microprocessor 12 includes various circuits which may access information from its memory hierarchy, where that information may be either data, instructions, or address translation tables. Note that the accesses described to this point deal with actual fetches of such information, that is, the retrieval of information where that information is fetched directly into pipeline 38. Typically, the fetched information is then acted upon in the clock cycle immediately following the cycle in which it was fetched. For example, an instruction fetched in a first clock cycle by instruction fetch stage 40 may be decoded by decode stage 42 in the next clock cycle following the first clock cycle. As another example, data fetched in a first clock cycle by data fetch stage 46 may be used by an execution unit in execution stage 48 in the next clock cycle following the first clock cycle. Lastly, note that the types of accesses described above are only by way of illustration, and still others will be ascertainable by one skilled in the art. For example, certain instructions may access the memory hierarchy to fetch information into the pipeline when the instruction is at any of various different stages of the pipeline. Moreover, the discussion of pipeline 38 above is merely by way of example, and instructions therefore may fetch information into the pipeline when passing through various pipeline stages of other types of pipeline architectures (e.g., reduced instruction set computer) as known in the art.

Having discussed accessing information by fetching, note that system 10 further includes various circuits and methodology pertaining to information accesses which involve prefetching rather than fetching. Prefetching differs from fetching in that prefetched information is retrieved speculatively rather than being retrieved because of an actual need to act upon the information as soon as it is received. In the present embodiments, prefetching is used to reduce effective access time through the memory hierarchy of system 10 as detailed below. Moreover, as introduced in the above Background, prefetching may involve an instance such as a load, a data store, or a store interrogate. In any event, at this point some introductory discussion is presented to facilitate an understanding of the embodiments below. Recall that information stored in external memory 14 also may be stored in various caches, with the different caches characterized in part by their location in the memory hierarchy as well as the type of information stored by a given cache. In the instance of prefetching, when a prefetch is desired by one of various circuits within microprocessor 12 (those circuits being discussed below), the requesting circuit issues a prefetch request corresponding to the desired information. Preferably, the prefetch request includes at least the address of the desired information as well as some indication of the size (e.g., number of bytes) of the desired information. In the preferred embodiment, note that the prefetch request is coupled directly to L2 unified cache 20 as opposed to a lower level cache structure. In other words, unlike a fetch request, the prefetch request does not access the lowest level(s) of cache which may store the particular type of information being sought by the request. Note that this approach arises because, in the preferred embodiment, L2 unified cache 20 is downward inclusive in its information, meaning that any information in a cache lower in order than L2 unified cache 20 is also stored in L2 unified cache 20. For example, if L1 data cache 18 stores a cache line of information, that same information is also stored in L2 unified cache 20. Consequently, if a prefetch operation is issued to L2 unified cache 20 resulting in a cache miss, then it is also known that none of the lower caches store the requested information as well and, therefore, it is beneficial to continue with the prefetch operation to bring the information on chip to L2 unified cache 20. Once the information is then brought on chip, if it is thereafter needed it is more readily accessible (i.e., at least in L2 unified cache 20) so an external access is not necessary. In this regard, note therefore that most of the benefit of prefetching is achieved by bringing the prefetched data on-chip. In other words, without the prefetch, if a fetch for that information is later issued and must retrieve the information off chip, then numerous clock cycles are likely required for this access. However, by prefetching the information onchip, then it will be available from at least one of the on-chip caches and, therefore, the time to access that information is considerably shorter than would be required from an off-chip access. Moreover, if a prefetch operation is issued to L2 unified cache 20 resulting in a cache hit, then it is known that the information is then available from L2 unified cache 20, and may even be available from a cache lower in the hierarchy as compared to L2 unified cache 20. In either location, therefore, the information is accessible in a relatively short time period as compared with having to retrieve it from an off chip resource. Additional benefits of this preferred action are described below. In any event, note that once the prefetch request is presented to L2 unified cache 20, without additional intervention it generally may be confirmed that L2 unified cache 20 either stores that information, or that information may be retrieved into L2 unified cache 20 from a higher level memory. Alternatively, the prefetched information may be stored in some other resource within microprocessor 12, such as within a group of prefetch buffers, where those buffers are either a part of L2 unified cache 20 or are a separate structure. In any event, once the information is prefetched, and if the speculative prefetch is correct, that is, if the information is thereafter needed for an actual fetch, then it is accessible from a cache (i.e., L2 unified cache 20) or other on-chip resource and, therefore, effective access time to the information is minimized.

As introduced above, various circuits may issue a prefetch request in the preferred embodiment. Some of the above circuits which may issue an actual fetch also may issue a prefetch request, and still others may issue just prefetch requests. In either event, various examples which are not particularly necessary to discuss for purposes of the present embodiments are discussed in U.S. Pat. No. 5,953,512 entitled "Circuits, Systems, And Methods Implementing A Loop And/Or Stride Predicting Load Target Buffer"

(Attorney Docket Number TI-24087), assigned to the same Assignee as the current patent, filed on the same date as the current patent, and which is hereby incorporated herein by reference. In connection with the present embodiments, note now that microprocessor 12 further includes a load target buffer ("LTB") 56 connected to L2 unified cache 20 (although in alternative embodiments the prefetch request it issues could be connected elsewhere, such as to a lower level cache(s)). At this point and by way of introduction, note that LTB 56 includes addresses of certain data fetching instructions and predictions based on which data will be used by those instructions in the future by microprocessor 12. Thus, once the data fetching instruction is itself fetched into pipeline 38, LTB 56 may be consulted to determine if it has an entry corresponding to the data fetching instruction. If so, and based on the prediction and possibly other information, LTB 56 or some controlling circuit such as arbitration circuit 36 as detailed later may then issue a prefetch request to L2 unified cache 20. Without other intervention, the prefetch request is responded to by a prefetch operation starting from L2 unified cache 20 and propagating upward through the memory hierarchy so that the data is confirmed to be currently on-chip (i.e., within one of its caches) or so it may be retrieved onto the microprocessor in response to the prefetch request Thus, once retrieved, the data is available for subsequent use once the data fetching instruction requires the data as the instruction passes through pipeline 38. Note also that it is stated shortly above that the prefetch operation occurs in response to the prefetch request if there is no other intervention. In this regard, however, note that in some instances the prefetch operation in response to the request may be suppressed, or modified, based on other system parameters. For more information on such a system, the reader is referred to U.S. Pat. No. 08/999,091 entitled "Circuits, Systems, And Methods For Prefetch Handling In A Microprocessor-Based System" (Attorney Docket Number TI-24153), assigned to the same Assignee as the current patent, filed on the same date as the current patent, and which is hereby incorporated herein by reference.

Figure 2:
FIG. 2 illustrates an entry in a branch target buffer "BTB" according to the preferred embodiment.

Having introduced system 10 of FIG. 1, FIG. 2 illustrates an embodiment of a single entry $41_1$ set forth in BTB 40 introduced above. Note that in the preferred embodiment, BTB 40 may include on the order of 512 entries in a 4-way set associate structure, but only one entry of one way is shown in FIG. 2 with it understood that the remaining entries in the present embodiment have the same format. Generally, each entry in BTB 41 is operable to store information corresponding to a different branch instruction. Thus, up to 512 different branch instructions may be identified in BTB 41 at a time. The specific formulation of each entry may be accomplished in various manners, and a brief introduction of the overall effect of BTB 41 is set forth here. In general, when a branch instruction is fetched by instruction fetch stage 40, BTB 41 is searched to determine if it stores an entry corresponding to that data fetching instruction. If not, then an entry is created and updated in response to subsequent incidents of that branch instruction. Once the entry is created, and provided it is set to a valid state, then it provides a branch target address which is the address of the next instruction to be executed after the branch instruction if the branch instruction is to take its branch (i.e., if the branch is to alter control to some instruction other than the one immediately following it in the sequence of instructions). In other words, suppose that a branch instruction is fetched by instruction fetch stage 40 and BTB 41 is found to have a valid entry corresponding to the branch instruction. In this instance, while the branch instruction is still at the relative top of instruction pipeline 38, the prediction from BTB 41 may be used to begin fetching the next instruction or instructions starting at the branch target instruction. Consequently, if the branch is to be taken and, therefore, fetching commences at this point from the branch target instruction forward, then those instructions are already in pipeline 38 once the branch instruction reaches execute stage 50. Thus, no additional time is then needed to flush instructions from the pipeline and to fetch the branch target instruction and its successive instructions as was already accomplished. Thus, microprocessor efficiency is enhanced, as better appreciated from the following detailed discussion of entry $41_1$.

Turning to entry $41_1$, its first two values are general to the branch instruction, with the remaining two values directed to predictions for speculative fetching of instructions corresponding to the branch instruction. Each of these values is described below.

Starting with the general values of entry $41_1$, its first value is an ADDRESS TAG. The ADDRESS TAG lists or otherwise corresponds to the address of where the branch instruction is stored in memory. For example, the ADDRESS TAG may include a logical address portion that is the address of a recently performed branch instruction as well as an offset portion indicating the starting offset of the specific instruction within the instruction code line associated with the logical address. Alternatively, physical addresses or any other type of address may be used as the ADDRESS TAB in entry $41_1$, if desired.

The second value of entry $41_1$, includes MISCELLANEOUS CONTROL INFORMATION about the branch instruction as that information is known in the BTB art. For example, a valid indicator may be stored as part of this value so as to later determine whether the information in the entry is valid and may be relied upon by other circuitry analyzing such information. Other examples will be ascertainable by a person skilled in the art.

Looking to the prediction related values of entry $41_1$, the third value in entry $41_1$ is a TARGET INSTRUCTION ADDRESS. The TARGET INSTRUCTION ADDRESS, as its name indicates, is the address to which the branch instruction branches if the branch is taken.

The fourth value in entry $41_1$ is a history or prediction value P, which either directly indicates, or is used to derive an indication of, the predicted state of the branch instruction. To simplify the current discussion, the P value of the following examples directly indicates the prediction for the corresponding branch instruction; however, by referring to a "prediction value" or "P" in this document, it is intended (unless stated otherwise) to include with the present embodiments any alternative where the prediction is either directly indicated by the field, or is further derived from this field, such as by using information from the field to address a secondary table or the like which further stores the actual prediction. Thus, a person skilled in the art may apply the present embodiments to alternative prediction formats and techniques. Returning then to P, note that it could include one or more additional bits, such as a bit to further indicate types of branches other tan conditional branches. For example, often a BTB entry will pertain to an unconditional branch such as CALL, RETURN, or JUMP. However, because these branches are unconditional, they are always predicted to occur. As demonstrated below, however, the present embodiments pertain more readily to conditional branch instructions which are sometimes predicted not taken. Nevertheless, in the preferred embodiment, P is a three-bit value to indicate each of these alternative branch instructions, as shown in the following Table 1:

TABLE 1

| VALUE | BRANCH TYPE | PREDICTION (IF CONDITIONAL BRANCH) |
|---|---|---|
| 111 | conditional branch | Strongly Predicted Taken (ST) |
| 110 | conditional branch | Predicted Taken (T) |
| 101 | conditional branch | Predicted Not Taken (NT) |
| 100 | conditional branch | Strongly Predicted Not Taken (SNT) |
| 011 | unconditional branch (CALL) | |
| 010 | unconditional branch (RETurn) | |
| 001 | unconditional branch (JUMP) | |
| 000 | invalid | |

The states ST, T, NT, SNT for predicting the result of a conditional branch are indicative of the history of whether or not the conditional branch was, in fact, taken in past occurrences of the branch. A conditional branch instruction preferably obtains either a T or NT history upon its first execution; this history is stored in BTB 41 with the entry for that branch instruction. If the same result occurs in the next successive occurrence of the branch, the "strongly" states are entered; for example, if the entry predicts not taken, and the execution unit thereafter detects the branch is again not taken, the prediction for that branch instruction is updated from taken to strongly taken. If a prediction value is set to a "strongly" state, the next opposite result moves the history information to a the same state but without the strongly indication; for example, if an SNT branch is "taken", its history is changed to NT. Other examples are known in the art.

According to the preferred embodiment, entry $41_1$ in BTB 41 also includes a value designated PBPA which indicates a past branch prediction accuracy measure for past occurrences of the branch instruction. Note that this PBPA value, as well as additional values which also may be included in each entry $41_1$, are described in U.S. Patent application Ser. No. 60/020,933, entitled "Microprocessor With Circuits, Systems, And Methods For Responding To Branch Instructions Based On History Of Prediction Accuracy" (Attorney Docket Number TI-22433), assigned to the same Assignee as the current patent, filed on Jun. 27, 1996, and which is hereby incorporated herein by reference (although the value referred to in this document as PBPA is referred to in U.S. patent application Ser. No. 60/020,933 as $PPA_n$, with the name changed herein to avoid confusion with additional terms used later). In any event, returning to the value designated PBPA, recall the prediction value P represents a history of whether, in fact, past occurrences of the branch instruction were taken. In contrast, the past prediction accuracy field PBPA represents a history of whether past predictions of the branch instruction were accurate. The preferred use for this additional field is described later. However, at this point, a discussion of the preferred formats of PBPA is appropriate. Also, note that PBPA may be originated and updated in various manners, and the following represents a few preferred techniques.

As a first example of encoding PBPA, returning briefly to FIG. 1, note now that execute stage 48, upon executing a branch instruction, may communicate a control signal (not shown) to BTB 41 as to whether the actual branch result matched the predicted branch result. Given this signal, in one embodiment, PBPA is a count which is incremented each time this control signal indicates a correct prediction and which is decremented each time this control signal indicates an incorrect prediction. Consequently, the higher the count of PBPA, the more accurate the predictions recently have been for the corresponding branch instruction. Moreover, the greater the number of bits in the count, the greater the resolution in its indication. Indeed, other references exist to counting branch predictors, such as in "Combining Branch Predictors", by Scott McFarling, available from the Western Research Laboratory ("WRL"), Technical Note TN-36, June, 1993, which is hereby incorporated herein by reference. In the preferred embodiment, a three-bit count is used so the count may reflect up to eight successive correct or incorrect predictions.

As a second example of encoding the PBPA field, note it also may simply record the past states of the above-mentioned control signal. For example, a six-bit PBPA field could demonstrate in time fashion the last six states of the control signal. Thus, if four occurrences of a high control signal (e.g., prediction accurate) were followed by two occurrences of a low control signal (e.g., prediction inaccurate), then the six-bit PBPA field would indicate 111100. Thus, a field with more 1's than 0's would indicate a higher recent incidence of accurate branch prediction. Indeed, rather than only evaluating the number of 1's and 0s in the PBPA field encoded in this fashion, note as still an additional alternative is to couple the sequence to a pattern history programmable table for receiving the PBPA value and outputting a prefetch code based on the past six occurrences of that value, where the prefetch code is an indicator based on the past six occurrences of the PBPA field as better appreciated later. In any event, note initially that the programmable table is located somewhere on microprocessor 12. Moreover, recall that the current embodiment of PBPA keeps a history of six of the past incidents of that value. Given six bits in this fashion, the total 6-bit sequence is used as an address to the programmable table. Note also as an alternative that some subset of these bits, that is, less than all six bits, could be used to address the programmable table 58. In any event, given that the values of PBPA may differ for any given incident of a data fetching instruction, there are a total of $2^6$ possible combinations of the values of PBPA over six successive incidents of those values. Thus, the programmable table includes 64 (i.e., $2^6$) different addressable locations, where each location stores a prefetch code as described below.

As demonstrated in later Figures, PBPA is one of three different values which may be used to determine whether a prefetch request should be issued for a data fetching instruction which follows the branch instruction having the value of PBBA. Thus, where PBPA is stored over the last six incidents of PBPA as in the present embodiment, this history is then input as a 6-bit input to the programmable table so that the table may output a prefetch code in response to the 6-bit input. As detailed below, note also that the prefetch code output in response to a first instance of an input sequence may be changed so that a different prefetch code is output in response to a second instance of the same input sequence. In this latter capacity, note that the programmable table is referred to as programmable because the output prefetch code corresponding to any of the 64 bit combinations may be changed during operation of microprocessor 12. Table 2 below depicts the four possible prefetch codes and is followed by a discussion of the interpretation and effect of those codes.

TABLE 2

| Prefetch code | Prefetch desired? | Next prefetch code if PBPA = 1 | Next prefetch code if PBPA = 0 |
|---|---|---|---|
| 00 | yes | 00 | 01 |
| 01 | yes | 00 | 10 |
| 10 | no | 01 | 11 |
| 11 | no | 10 | 11 |

Table 2 demonstrates whether a use operation is desirable for a given output prefetch code, and further whether that code should be changed based on a current incident of a data fetching instruction. For example, suppose that six successive values of PBPA equal a sequence of 111111. Thus, for each of a first through a sixth incident of a branch instruction, the actual branch result matched the predicted branch result. Therefore, for instances where successive matches correspond to a desire to issue a prefetch request for a data fetching instruction following the branch instruction which gave rise to such matches (where such instances are discussed later), then the programmable table may be programmed to output the appropriate prefetch code in response to these six successive incidents. In other words, for the seventh incident of the branch instruction the programmable table is addressed at its address of 111111 and suppose it outputs a prefetch code of 00. From the second column of Table 2, this code equal to 00 indicates that it is desirable to issue a prefetch request for a data fetching instruction which follows this seventh incident of the branch instruction. However, assume further that this seventh incident of the branch instruction produces an actual branch address which does not match the predicted branch result (i.e., PBPA=0 for this seventh incident). Thus, the value of PBPA equal to 0 is added as the most recent bit of the 6-bit PBPA field and, for the next branch instruction, that is, for the eighth incident, the programmable table will be addressed at its address of 111110 to output the appropriate prefetch code. In addition, however, the current value of PBPA is used in response to graduating the branch instruction for the seventh incident to update the prefetch code from the preceding incident (i.e., the value of 00 output in response to the address of 111111 used for the sixth incident) if such an update is necessary. Specifically, since the value of PBPA is now zero due to the mis-match of the actual and predicted branch address, then according to the fourth column of Table 2, the prefetch code for address 111111 should be changed from 00 to 01. Thus, the next time the address 111111 is input to the programmable table, it will output a value of 01 rather than 00. From this example, note then that the above may repeat at some later time, once again changing the prefetch code corresponding to the address 111111, either back to 00 or even to 10 (suggesting a use is not desirable).

The above discussion of the programmable table suggests a single programmable table to be used by all BTB entries. However, note that in an alternative embodiment multiple tables could be used, even to the point where each BTB entry had its own corresponding programmable table. In this latter event, however, note that the amount of input bits (i.e., the amount of history for PBPA) is preferably reduced. Otherwise, each of the BTB entries would require its own 64 bit programmable table which may or may not be larger than desirable for some applications. As yet another alternative, note further that entries for some branch instructions could access one programmable table while entries for other branch instructions access a different programmable table. Still other examples may be ascertained by one skilled in the art.

Figure 3:
FIG. 3 illustrates an entry in a load target buffer "LTB" according to the preferred embodiment.

FIG. 3 illustrates an embodiment of a single entry $56_1$ set forth in LTB 56 introduced above. Note that in the preferred embodiment, LTB 56 may include on the order of 2048 entries in an 8-way set associative structure, but only one entry $56_1$ of one way is shown in FIG. 3 with it understood that the remaining entries in the present embodiment have the same format. Generally, each entry in LTB 56 is operable to store information corresponding to a different data fetching instruction. Thus, up to 2048 different data fetching instructions may be identified in LTB 56 at a time. The specific formulation of each entry may be accomplished in various manners, and a brief introduction of the overall effect of LTB 56 is set forth here. In general, when a data fetching instruction is fetched by instruction fetch stage 40, LTB 56 is searched to determine if it stores an entry corresponding to that data fetching instruction. If not, then an entry is created and updated in response to subsequent incidents of that data fetching instruction. Once the entry is created, and provided it is set to a valid state, then it predicts the address of the data to be fetched by a data fetching instruction, and for purposes of discussion this data will be referred to as target data and its address will be referred to as a target data address. In other words, suppose that a data fetching instruction is fetched by instruction fetch stage 40 and LTB 56 is found to have a valid entry corresponding to the data fetching instruction. In this instance, while the data fetching instruction is still at the relative top of instruction pipeline 38, the prediction from LTB 56 may be used to issue a prefetch request for the data address predicted by the LTB entry with the decision as to whether such a prefetch request is issued based on still additional consideration detailed later. In the event that the prefetch request is issued, however, the data may be prefetched to a cache or the like on the microprocessor chip. Thereafter, before or once the data fetching instruction reaches its execution stage, it may fetch the data directly from the cache, without therefore having to access the data from a memory external from the microprocessor (i.e., because the data was already prefetched into that cache). In other words, prefetching in this manner reduces the cost of a cache miss and, therefore, improve microprocessor efficiency. Thus, microprocessor efficiency is enhanced, as better appreciated from the following detailed discussion of entry $56_1$.

Turning to entry $56_1$, its first three values are general to the data fetching instruction, with the remaining three values directed to predictions for prefetching data corresponding to the data fetching instruction. Each of these values is described below.

Starting with the general values of entry $56_1$, its first value is an ADDRESS TAG. The ADDRESS TAG lists or otherwise corresponds to the address of where the data fetching instruction is stored in memory. The second value of entry $56_1$ includes MISCELLANEOUS CONTROL INFORMATION about the data fetching instruction, where such information may be analogous to information listed in BTB entry $41_1$ for a branching instruction. For example, a valid indicator may be stored as part of this value so as to later determine whether the information in the entry is valid and may be relied upon by other circuitry analyzing such information. Other examples will be ascertainable by a person skilled in the art. The third value of entry $56_1$ is the ACCESS TYPE of the data fetching instruction. Various example of access types were earlier introduced. For example, a more straightforward access type is a fetch request, where the data fetching instruction seeks to retrieve (i.e., load) information from a certain memory location. As another example, however, the request may be a data store interrogate. In this case, the data store interrogate is a request to prepare some memory structure to receive data, but no data is actually retrieved. Alternatively, the request may be a data fetch store interrogate. Here, like the data store interrogate, the request again seeks to prepare some memory structure to receive data; in addition, however, here a group of data is retrieved into a cache as part of the preparation, with the anticipation that part of that group will be overwritten by a subsequent store to that group. Still other types of requests will be ascertainable by a person skilled in the art.

The fourth value in entry $56_1$ is a PREDICTION POINTER. The PREDICTION POINTER is able to store a predicted target data address which corresponds to the data fetching instruction identified by the ADDRESS TAG. In other words, the address identified by the PREDICTION POINTER represents a prediction of the address of the target data which will be used by the instruction and, therefore, provides an address of data which may be prefetched for the instruction associated with entry $56_1$.

The fifth value in entry $56_1$ is PPPAA, and it provides a first of two values which may be used to determine whether a prefetch operation for the data fetching instruction in entry $56_1$ is desirable. More specifically, PPPAA indicates a past predicted prefetch address accuracy measure for past incidents of the corresponding data fetching instruction in LTB 56. In other words, note that a valid PREDICTION POINTER in an entry of LTB 56 predicts a target data address for a corresponding data fetching instruction and, based upon potential remaining considerations detailed later a prefetch request may be issued which includes the predicted target data address. In response to this prefetch request, and if the predicted data is not already on-chip, a prefetch operation typically takes place, absent some other intervention such as the operation of access controller 22 to prevent or otherwise modify the prefetch operation based on various system parameters. If the prefetch operation takes place, recall that the prefetched information is brought on-chip to some storage resource, such as to a cache or prefetch buffer. Thereafter, once the data fetching instruction is sufficiently through pipeline 38, an actual target data address is determined and a fetch for the data at the actual target data address takes place. Therefore, if the prediction from the appropriate entry of LTB 56 is accurate, then the data earlier prefetched now may be fetched from the on-chip storage resource. Summarizing these operations for the current context, note therefore that the processing of a data fetching instruction through pipeline 38 generates both a predicted target data address from LTB 56 and an actual target data address as the data fetching instruction progresses through pipeline 38. Having access to both of these two addresses for a given data fetching instruction, the present embodiment compares the two to create a value for PPPAA. Specifically, if the two addresses match, then the most recent prediction of the entry in LTB 56 is accurate; conversely, if the two addresses do not match, then the most recent prediction of the entry in LTB 56 is inaccurate. These findings may be encoded and updated in PPPAA in various manners, where the following represents a few preferred techniques.

As a first example of encoding the value of PPPAA, note from the preceding paragraph that sufficient information is available to compare the predicted target data address and the actual target data address for a given incident of a data fetching instruction. Thus, in one embodiment, PPPAA is a count which advances in a first direction in response to an accurate prediction by the predicted address value, where the count advances in a second direction opposite the first direction in response to an inaccurate prediction by the predicted address value. For example, the first direction may be incrementing such that the counter is incremented each time the compared target data addresses match and, therefore, the second direction is decrementing such that counter is decremented each time the compared target data addresses do not match. Consequently, the higher the count of PPPAA, the more accurate the predictions recently have been for the corresponding data fetching instruction. Moreover, the greater the number of bits in the count, the greater the resolution in its indication. In the preferred embodiment, a five-bit count is used so the count may reflect up to thirty-two successive correct or incorrect predictions. Moreover, note further that the count is preferably first established at the same time the entry is created in LTB 56 for a given data fetching instruction, and that the initial value of the count is set at some mid-range between its extremes. Thus, for the example of a five-bit counter, its extremes are 0 to 31, so it preferably is initialized to a value of 15 (i.e., binary 01111) or 16 (i.e., binary 10000). Note that by initializing the count to a mid-range in this manner, its initial indication does not favor either one extreme or the other, that is, at that point the PPPAA does not wrongfully suggest that there have been past incidents of either proper or improper prediction. Instead, the immediately following incidents of the corresponding data fetching instruction are able to change the count value toward an indication of either proper or improper prediction by either incrementing or decrementing the count as described above.

As a second example of encoding the value of PPPAA, note also that the PPPAA value may record the past determinations of whether the predicted target data address and the actual target data address match as a sequential history. For example, a six-bit PPPAA field could demonstrate in time fashion the last six states of the comparison between these two addresses. Thus, if four occurrences of an inaccurate prediction were followed by two occurrences of an accurate prediction, and if accuracy were indicated by a logic high signal, then the six-bit PPPAA field would indicate 000011. Thus, a field with more 1's than 0's would indicate a higher recent incidence of accurate prediction. Additionally, recall from the discussion of PBPA above that a history of bits may be input to a programmable pattern history table. Thus, from that discussion, note further that the present embodiments further contemplate the use of such a pattern history table with PPPAA as well. Indeed, note further that such a table may be combined so that a single table is addressed in response to combined values of PBPA and PPPAA.

Given either of the encoding embodiments for PPPAA as described above, one skilled in the art will be able to ascertain still additional embodiments as well. In any event, note now that PPPAA was introduced above as a value which may be used to determine whether a prefetch operation for the data fetching instruction in entry $56_1$ is desirable. In other words, note now that the higher the value of PPPAA, the more accurate the recent predictions of the target data address have been. Thus, for future incidents of the same data fetching instruction, it may well be that corresponding prefetch requests are also desirable. In other words, since past predictions have been accurate, then future predictions are also likely to be accurate and, therefore, the benefits of prefetching may be achieved by issuing prefetch requests corresponding to the those future predictions. Conversely, and as detailed below, the lower the value of PPPAA, the less accurate the recent predictions of the target data address have been. Thus, for future incidents of the same data fetching instruction, it may well be that the future predictions will be inaccurate; therefore, it may not be worthwhile to burden the prefetching-related resources with a prefetch request and/or operation since the prediction is likely inaccurate and, thus, a prefetch operation based on an inaccurate prediction may not be helpful. In any event, the application of the PPPAA value for further use with the present embodiments is detailed later.

The sixth value in entry $56_1$ is PPU, and it provides a second of two values which may be used to determine whether a prefetch operation for the data fetching instruction in entry $56_1$ is desirable (i.e., with PPPAA being the first value). More specifically, PPU indicates the past prefetch usefulness of the corresponding data fetching instruction in response to determining the location of the predicted target data before prefetching. In other words, note that when a prefetch request is issued, the prefetched data may be stored at various levels. For example, in microprocessor 12 of FIG. 1, recall that the prefetch request is first issued to L2 unified cache 20 to determine whether the requested target data is stored there. Moreover, in the preferred embodiment, if a hit occurs in L2 unified cache 20, then no prefetch operation occurs. On the other hand, if a miss occurs in L2 unified cache 20 then, absent some other consideration, the data from the predicted target data address is prefetched (i.e., retrieved) into L2 unified cache 20 from some off-chip resource, such as an external cache, main memory 14, or the on-chip memory from another microprocessor. Simplifying the above, note that in response to a prefetch request, the preferred embodiment determines whether the predicted target data is either on-chip or off-chip. Also in the preferred embodiment, only when the predicted target data is off-chip does the additional prefetch operation take place. In other words, if the predicted target data address is off-chip, the present inventors have deemed it is useful to prefetch the data to an on-chip resource so that it later may be fetched when the data fetching instruction passes further into pipeline 38. Conversely, if the predicted target data address is already on-chip (e.g., in L2 unified cache 20), then the already on-chip data thereafter may be fetched from the on-chip storage resource when the data fetching instruction passes further into pipeline 38. Thus, in this latter instance, an additional prefetch operation is deemed not to be useful because the data is already on-chip. Summarizing the above, a prefetch operation for one incident of a data fetching instruction may be useful (i.e., where the predicted target data address is off-chip) while a prefetch operation for another incident of the data fetching instruction is not necessarily useful. Given these two possibilities, PPU maintains a history of this usefulness for successive incidents of a data fetching instruction, and the value of PPU may be encoded and updated in various manners, where the following represents a few preferred techniques.

As a first example of encoding the value of PPU, note that it may be embodied in a counter in a manner similar to the value of PPPAA discussed above. Thus, in one embodiment, PPU is also a count, and it advances in a first direction in response to a useful prefetch (e.g., one where the predicted target data is off-chip), while it advances in a second direction opposite the first direction in response to a prefetch which is deemed not useful (e.g., one where the predicted target data is on-chip). Again, therefore, by way of example, the first direction may be incrementing such that the counter is incremented each time the predicted target data is off-chip and, therefore, the second direction is decrementing such that counter is decremented each time the predicted target data is on-chip. Consequently, the higher the count of PPU, the more useful prefetching has been base on the recent predictions for the corresponding data fetching instruction. Moreover, the greater the number of bits in the count, the greater the resolution in its indication. In the preferred embodiment, a five-bit count is used so the count may reflect up to thirty-two successive useful or not useful prefetch events corresponding to successive incidents of the data fetching instruction. Moreover, again the count is preferably first established at the same time the entry is created in LTB 56 for a given data fetching instruction, and that the initial value of the count is set at some mid-range between its extremes so that count does not favor either one extreme or the other.

As a second example of encoding the value of PPU, note that it may be embodied in a history sequence also similar to the value of PPPAA discussed above. In the instance of PPU, therefore, the history sequence would reflect the past determinations of whether the prefetch was useful. For example, a six-bit PPU field could demonstrate in time fashion the last six states of the determination. Thus, if four occurrences of a prediction of data which were prefetched from off-chip were followed by two occurrences of a prediction of data found to be on-chip, then the six-bit PPU field would indicate 111100. Thus, a field with more 1's than 0's would indicate a higher recent incidence of off-chip prefetched data. Additionally, recall from the discussion of PBPA and PPPAA above that a history of bits may be input to a programmable pattern history table. Thus, from that discussion, note further that the present embodiments further contemplate the use of such a pattern history table with PPU as well. Indeed, note further that such a table may be combined so that a single table is addressed in response to combined values of PPU and/or either PBPA or PPPAA.

While the above presents two embodiments for encoding the value of PPU, note that various additional implementations may be ascertained by a person skilled in the art given the current teachings. For example, the above discussion adjusts PPU based on only two states, that is, whether the predicted data is on-chip or off-chip. However, an alternative embodiment may present more information about where the data is located. Thus, a different code could be attributed to different locations, such as in which on-chip storage the data is found or in which off-chip storage the data is found. In any event, note also that PPU also was introduced above as value which may be used to determine whether a prefetch operation for the data fetching instruction in entry $56_1$ is desirable. In other words, note now that the higher the value of PPU, the more useful the recent prefetching operations for the corresponding data fetching instruction have been. Thus, for future incidents of the same data fetching instruction, it may well be that corresponding prefetch requests are also desirable. Conversely, and as detailed below, the lower the value of PPU, the less useful the recent prefetching operations have been. Again, therefore, for future incidents of the same data fetching instruction, it may not be worthwhile to burden the prefetching-related resources with a prefetch request and/or operation since the usefulness of the result may be limited. In any event, the application of the PPU value for further use with the present embodiments is detailed later.

Figure 4:
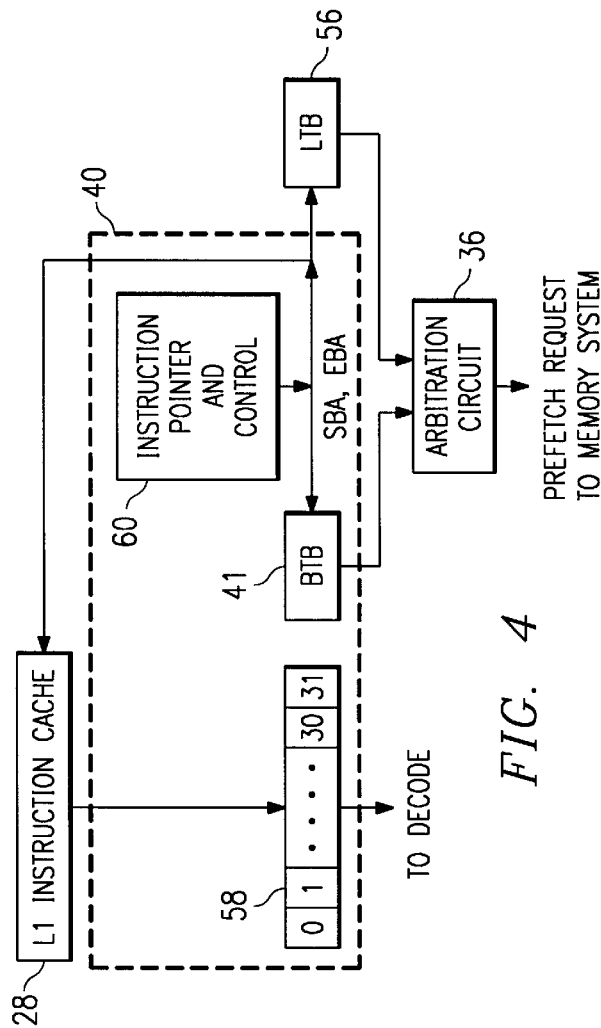
FIG. 4 illustrates various components of the microprocessor of FIG. 1, with emphasis directed to instruction fetch stage 40, BTB 40, LTB 56, and arbitration circuit 36.

FIG. 4 illustrates various of the components of FIG. 1 shown above, and further details certain additional items to focus the following discussion on various inventive aspects. With respect to already-introduced components, FIG. 4 illustrates L1 instruction cache 28 connected to instruction fetch stage 40 which includes BTB 41, and further shows connections of both BTB 41 and LTB 56 to arbitration circuit 36. With respect to these connections, and as detailed below, in addition to the general functionality discussed above arbitration circuit 36 further operates to analyze various information from both BTB 41 and LTB 56 to determine when a prefetch request should be issued for a data fetching instruction in instruction fetch stage 40.

Turning to the newly-illustrated aspects of FIG. 4, note that it further details an instruction line 58 within instruction fetch stage 40. Instruction line 58 is a storage structure for storing a plurality of instructions fetched from L1 instruction cache 28, and which are stored in the order in which they appear in the 80×86 (or other architecture) program. Moreover, in the preferred embodiment, these instructions are stored by successive bytes, where a single instruction may require one or more bytes to encode the instruction. For purposes of example, instruction line 58 includes a total of thirty-two bytes designated as 0 through 31 on FIG. 4. For purposes of reference, note that the time-ordering of instructions in instruction line 58 is from left to right, that is, the instruction farthest to the left in instruction line 58 is sequentially before any one or more instructions to its right in instruction line 58.

FIG. 4 also introduces an instruction pointer and control circuit 60 within instruction fetch stage 40. For purposes of later discussion, note that instruction pointer and control circuit 60 defines an "instruction window" among the instructions in the instruction line 58. In this regard, instruction pointer and control circuit 60 provides both a starting byte address (abbreviated "SBA") and an ending byte address (abbreviated "EBA") to L1 instruction cache 28 so that it may output a line of instruction bytes to instruction line 58. Note further that SBA and EBA are also connected to both BTB 41 and LTB 56. More particularly, note that the instruction pointer of circuit 60 will, according to principles known in the art, provide an indication of the next instruction to be processed by microprocessor 10. Thus, this indication translates to a byte address in instruction line 58, where that byte is the first byte of the next instruction to be processed (or only byte if the instruction is a single byte instruction). This byte address, therefore, is the SBA provided by instruction pointer and control circuit 60 to BTB 41 and LTB 56. Additionally, note that microprocessor 10 is also preferably operable to issue (or schedule) more than one instruction at a time. Thus, in the preferred embodiment, this same number of instructions also may be considered in a single instance by BTB 41 and LTB 56. For purposes of discussion, assume that microprocessor 10 is a four instruction issue device, meaning microprocessor 10 may schedule up to four instructions for concurrent execution. Therefore, the EBA represents the last byte of the fourth instruction in the sequence of instructions beginning with the first instruction as identified by the SBA. Note also that EBA is an optional signal, and typically will be presented in an architecture having fixed length instructions. In a variable length architecture, therefore, the last byte in the instruction window may be determined by other approaches, such as by considering it to be the last byte in instruction line 58. Given the above, therefore, one skilled in the art will appreciate that up to a certain number of instructions (e.g., four) may be identified as an instruction window in instruction line 58.

Figure 5:
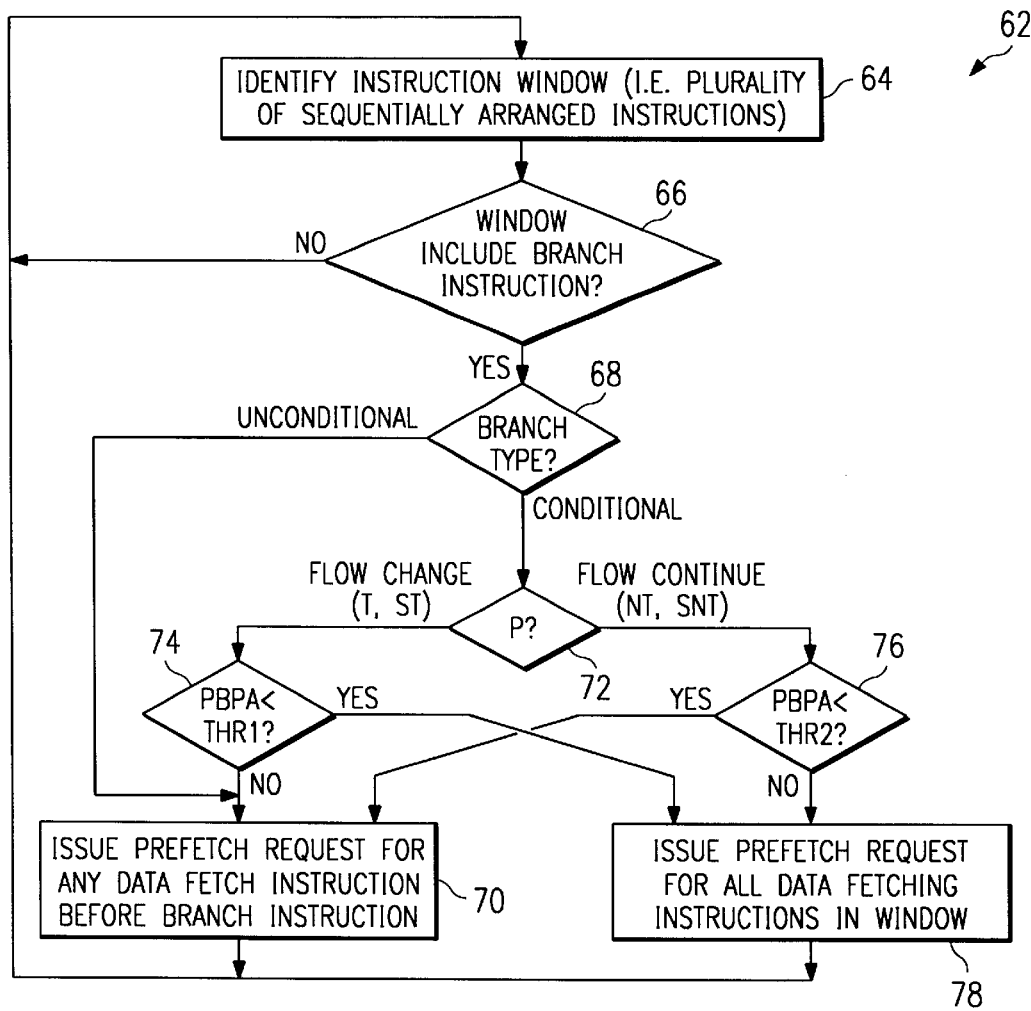
FIG. 5 illustrates a flow chart of a first method embodiment for the circuits of FIG. 4, where the first method embodiment issues prefetch requests for data fetching instructions based on a confidence measure of the branch prediction.

FIG. 5 illustrates a method of operation of the circuits of FIG. 4, where the method is designated generally at 62 and begins with a step 64. Before proceeding with a detailed discussion of the steps of method 62, note generally that each step is preferably performed by the circuits described above and, given the skill in the art, may be accomplished using various different embodiments given access to the functional description set forth below. Moreover, also before detailing each step of method 62, an introductory comment about its overall purpose is instructive. FIG. 4 introduced the concept of both BTB 41 and LTB 56 having simultaneous access to an in instruction window which is a group of sequentially arranged instructions in instruction line 58. FIG. 4 further demonstrates that the information from both BTB 41 and LTB 56 is also provided to arbitration circuit 36. Given this information, note further that one of the instructions in the instruction window may be a branch instruction which therefore is identifiable by BTB 41, and one or more of the instructions in the instruction window may be a data fetching instruction which therefore is identifiable by LTB 56. Given these possibilities, and in response to the existence of both a branch instruction and one or more data fetching instruction in the same instruction window, note now that arbitration circuit 36 may issue a prefetch request for one or more of the data fetching instructions based on a combination of considerations from both BTB 41 and LTB 56. In other words, rather than issuing a prefetch request solely on the basis of the indication of LTB 56, arbitration circuit 36 further considers the values provided by BTB 41 to further determine when a prefetch request is appropriate for a given data fetching instruction. Given this introduction, method 62 is detailed below, starting with its first step 64.

Step 64 identifies the instruction window. Thus, in the present embodiment, step 64 is accomplished where instruction pointer and control circuit 60 issues its SBA and EBA values. For purposes of the present discussion as well as some examples to follow, assume that the instruction window is four instructions long; thus, it includes four or more bytes within instruction line 58 which correspond to those four instructions, with the first of the four sequentially arranged instructions being to the relative left side of instruction line 58. Note also that the use of instruction line 58, the issuance of an SBA and an EBA, as well as the length of the instruction window are all by way of one embodiment. Therefore, one skilled in the art will appreciate that step 64 may be achieved in various other manners, where those manners effectively define a plurality of sequentially arranged computer instructions for purposes of subsequent analysis discussed below.

Step 66 determines whether the current instruction window includes a branch instruction. Note from the above introduction that the present method deals with the instance of both a branch instruction and one or more data fetching instructions in the same sequence of instructions being considered. Thus, according to step 66, if no branch instruction is located within the instruction window, method 62 returns the flow to step 62 and awaits the next defined plurality of instructions to once again determine whether it includes a branch instruction. Clearly, however, note that additional steps to implement other methods may be used in response to finding no branch instruction. In other words, it may still be the case that the current instruction window includes one or more data fetching instructions in which instance LTB 56 may be used to otherwise respond to the data fetching instruction(s). For example, the reader is again referred to the first two patents (i.e., Attorney Docket Numbers TI-24087 and TI-24153) which are incorporated by reference earlier for certain such techniques. Still other examples may be found in U.S. Pat. No. 5,909,566, entitled "Microprocessor Circuits, Systems, And Methods For Speculatively Executing An Instruction Using Its Most Recently Used Data While Concurrently Prefetching Data For The Instruction" (Attorney Docket Number TI-24623) and U.S. patent application Ser. No. 09/000,937, entitled "Microprocessor Circuits, Systems, And Methods Implementing a Load Target Buffer With Entries Relating To Prefetch Desirability" (Attorney Docket Number TI-25204), both of which are assigned to the same Assignee as the current patent, both of which are filed on the same date as the current patent, and both of which are which are hereby incorporated herein by reference. In any event, returning to method 62, if the instruction window includes a branch instruction, method 62 continues to step 68.

Step 68 determines whether the branch instruction identified in step 66 is conditional or unconditional such as by evaluating the value shown in Table 1 above. If the branch instruction is unconditional, method 62 continues to step 70. On the other hand, if the branch instruction is conditional, method 62 continues to step 72.

From the above, note that one manner in which step 70 may be reached is when the instruction window includes both a branch instruction as well as a data fetching instruction, and the branch instruction is determined to be an unconditional branch instruction. In response, step 70, such as by using arbitration circuit 36, issues a prefetch request for any data fetching instruction in the instruction window and sequentially arranged before the branch instruction. Note, therefore, that no prefetch request is issued for any data fetching instruction which is in the instruction window but is sequentially arranged after the unconditional branch instruction. This operation is perhaps better appreciated by the example shown in FIG. 6a described below.

Figure 6A:
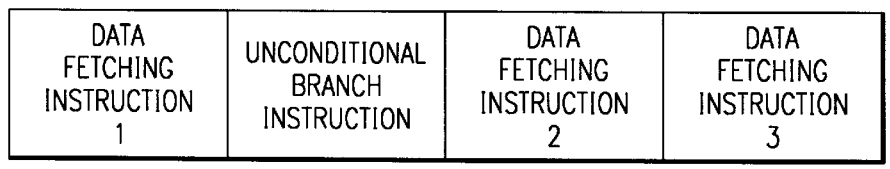
FIG. 6a illustrates four instructions arranged in an instruction window, where one of the four instructions is an unconditional branch instruction.

FIG. 6a illustrates four instructions intended to be part of an instruction window, where those four instructions result in step 70 being reached because the instruction window includes an unconditional branch instruction. More specifically, FIG. 6a illustrates a first data fetching instruction 1, followed in sequence by an unconditional branch instruction, followed in sequence by a second data fetching instruction 2, followed in sequence by a third data fetching instruction 3. Given step 70, therefore, note that it issues a prefetch request for data fetching instruction 1, but does not issue a prefetch request for either data fetching instruction 2 or data fetching instruction 3. Thus, one skilled in the art will appreciate that the progress of FIG. 5 as explained thus far enhances efficiency of prefetch operations given unconditional branching instructions. In other words, a less efficient possibility would be to permit LTB 56 to operate independently of BTB 41 and, thus, to issue a prefetch request for each data fetching instruction in the instruction window. However, the steps above and the circuits implementing them recognize that, due to the unconditional nature of the branch instruction in FIG. 6a, neither data fetching instruction 2 nor data fetching instruction 3 will be reached. In other words, the unconditional branch instruction changes the flow of the program. Thus, the instructions immediately following the unconditional branch instruction (i.e., data fetching instructions 2 and 3) are not reached. Because these two additional data fetching instructions are not reached, it therefore would be inefficient to burden the prefetching-related circuits to issue prefetch requests and perhaps perform prefetch operations in response to those not-reached instructions. Consequently, method 62 as described thus far avoids this otherwise possible burden. Indeed, as detailed below, method 62 likewise avoids other potential burdens by detecting and responding to still additional combinations of branch instructions and data fetching instructions.

Turning to step 72, recall it is reached when a branch instruction is detected within the instruction window, but where that branch instruction is determined to be conditional rather than unconditional. In response, step 72 directs flow based on the prediction value, P, for the detected branch instruction. Specifically, if the branch instruction is of the type for which program flow is predicted to change (e.g., either predicted Taken or Strongly Taken), then method 62 continues to step 74. On the other hand, if the branch instruction is of the type for which program flow is predicted not to change (e.g., either predicted Not Taken or Strongly Not Taken), then method 62 continues to step 76. Each of these alternative steps is discussed below.

Figure 6B:
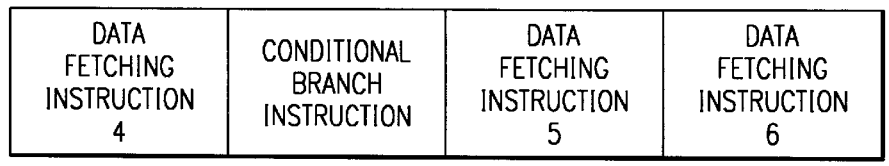
FIG. 6b illustrates four instructions arranged in an instruction window, where one of the four instructions is a conditional branch instruction.

Step 74 evaluates the likely accuracy of the prediction used in step 72. More specifically, recall from FIG. 2 that each entry in BTB 41 in the preferred embodiment includes a PBPA value, which recall further indicates a past branch prediction accuracy measure for past occurrences of the branch instruction. In other words, PBPA is effectively a confidence measure of whether the prediction P is accurate. Thus, the higher the value of PBPA, the higher the confidence in the prediction by P. Given the availability of PBPA, step 74 compares it against a threshold abbreviated in FIG. 5 as THR1. For example, if PBPA is encoded by a counter as described above, the value of THR1 could be 50 percent. Using this example, therefore, step 74 evaluates the value of PBPA for the branch instruction detected in step 68 and compares it to a value of 50 percent. If PBPA is below 50 percent (i.e., relatively low confidence in P), method 62 continues to step 78. On the other hand, if PBPA is equal to or greater than 50 percent (i.e., relatively high confidence in P), method 62 continues to step 70. The flow from step 74 to either step 70 or step 78 is perhaps better understood again by way of example and, therefore, FIG. 6b illustrates four instructions intended to be part of an instruction window, where those four instructions result in step 74 being reached because the instruction window includes a conditional branch instruction. As an introduction, therefore, FIG. 6b illustrates a data fetching instruction 4, followed in sequence by a conditional branch instruction, followed in sequence by a data fetching instruction 5, followed in sequence by a data fetching instruction 6.

Returning now to step 70, recall from earlier that it may be reached in response to method 62 detecting an unconditional branch. However, the immediately preceding paragraph also now demonstrates that step 70 alternatively may be reached in response to detecting a conditional branch instruction, and where that conditional branch instruction has a corresponding relatively high prediction value that the branch will change program flow. For example, looking to FIG. 6b, assume that the conditional branch instruction has a corresponding PBPA value of 80 percent. Thus, in addition to a P value of either Taken or Strongly Taken, the relatively high PBPA value further suggests a considerable likelihood that program flow will change after the conditional branch instruction of FIG. 6b. Therefore, note again that step 70 only issues a prefetch request for a data fetching instruction preceding the branch instruction; in the current example, therefore, a prefetch request is only issued for data fetching instruction 4. Moreover, no prefetch request is issued for either data fetching instruction 5 or data fetching instruction 6. Therefore, one skilled in the art will appreciate that the method flow from step 72, to step 74, to step 70, once again enhances efficiency over an alternative technique where the indications of LTB 56 are used to issue prefetch requests independent of the indications of BTB 41. In other words, in a manner similar to the discussion above following the flow from step 68 to step 70, if only LTB 56 were considered for the example of FIG. 6b, then prefetch requests for both data fetching instruction 5 and data fetching instruction 6 also would be issued. However, the current flow from step 72, to step 74, to step 70 recognizes that it is unlikely that either data fetching instruction 5 and data fetching instruction 6 will actually be reached and, thus, preferably no prefetch request is issued for either of those data fetching instructions.

Turning now to step 78, note it is reached in one instance in response to detecting a conditional branch instruction, and where that conditional branch instruction has a corresponding relatively doubtful prediction value that the branch will change program flow. In other words, even though the prediction value P indicates a change in program flow, there is relatively low confidence in that prediction and, thus, in fact, a change in program flow may not occur once the branch instruction is actually executed to determine whether the change in program flow should occur. Therefore, note now that step 78 issues a prefetch request for any data fetching instruction in the instruction window. Thus, assume that the example of FIG. 6b is used to reached step 78, that is, assume that the value of PBPA corresponding to the branch instruction is less than THR1. In response, step 78 not only issues a prefetch request for data fetching instruction 4, it also issues a prefetch request for both data fetching instruction 5 and data fetching instruction 6. Therefore, because there is a considerable possibility that program flow will not change even though it is predicted to change, the present embodiment proceeds with the prefetch requests for any one or more data fetching instruction(s) after the branch instruction in the instruction window. Thus, should the prediction ultimately be inaccurate, then the prefetch operation may already have occurred for the subsequent data fetching instructions and, thus, the benefits of prefetching (i.e., either confirming data on-chip or retrieving it on-chip) are realized as to those instructions.

Having completed a discussion of the flow after step 72 to step 74, and then to either step 70 or step 78, recall further that step 72 alternatively directs flow to step 76 when the prediction value P indicates that program flow will not change (e.g., a P of Not Taken or Strongly Not Taken). One skilled in the art will now appreciate from the following discussion that step 76, in a manner similar to step 74 but for an opposite circumstance, further enhances prefetch activity by further considering the additional effect of PBPA. In this regard, step 76 also evaluates the likely accuracy of the prediction used in step 72. More specifically, step 76 compares PBPA against a threshold abbreviated in FIG. 5 as THR2. Note that THR2 may be the same value as THR1 of step 74. Again, therefore, for purposes of example, assume PBPA is encoded by a counter and the value of THR2 is 50 percent. Using this example, step 76 evaluates the value of PBPA for the branch instruction detected in step 68 and compares it to a value of 50 percent. If PBPA is below 50 percent (i.e., relatively low confidence in P), method 62 continues to step 70. On the other hand, if PBPA is equal to or greater than 50 percent (i.e., relatively high confidence in P), method 62 continues to step 78.

The immediately preceding paragraph demonstrates yet a third alternative path that results in method 62 reaching step 70. In this alternative, step 70 is reached in response to detecting a conditional branch instruction, and where that conditional branch instruction has a corresponding relatively doubtful prediction value that the branch will not change program flow. For example, looking to FIG. 6b, assume that the conditional branch instruction has a P value of either Not Taken or Strongly Not Taken, but a corresponding PBPA value of 20 percent. Thus, the relatively low PBPA value further suggests a considerable likelihood that, even though program flow is predicted not to change, it may in fact change because the prediction may be inaccurate. Therefore, note again that step 70 only issues a prefetch request for data fetching instruction 4, and therefore no prefetch request is issued for either data fetching instruction 5 or data fetching instruction 6. Therefore, efficiency is potentially improved over an alternative technique where the indications of LTB 56 alone would also cause prefetch requests to issue for both data fetching instruction 5 or data fetching instruction 6. In other words, the current flow from step 72, to step 76, to step 70 recognizes that it is unlikely that either data fetching instruction 5 and data fetching instruction 6 will actually be reached and, thus, preferably no prefetch request is issued for either of those data fetching instructions.

Lastly, returning now to step 78, note it is reached in another instance in response to detecting a conditional branch instruction, but here the conditional branch instruction has a corresponding relatively reliable prediction value that the branch will not change program flow. In other words, in addition to the prediction value P indicating no change in program flow, there is relatively high confidence in that prediction; thus, in fact, a change in program is likely not to occur once the branch instruction is actually executed to determine whether the change in program flow should occur. Therefore, again step 78 issues a prefetch request for any data fetching instruction in the instruction window. Thus, assume again that the example of FIG. 6b is used to pass from step 72, to step 76, to step 78, that is, assume that P for the conditional branch instruction predicts no change in program flow and that the corresponding PBPA value is equal to or greater than THR2. In response, step 78 not only issues a prefetch request for data fetching instruction 4, it also issues a prefetch request for both data fetching instruction 5 and data fetching instruction 6. Therefore, because there is a considerable possibility that program flow will not change, the present embodiment proceeds with the prefetch requests for any one or more data fetching instruction(s) after the branch instruction in the instruction window. Again, therefore, the benefits of prefetching are realized as to those data fetching instructions.

Figure 7:
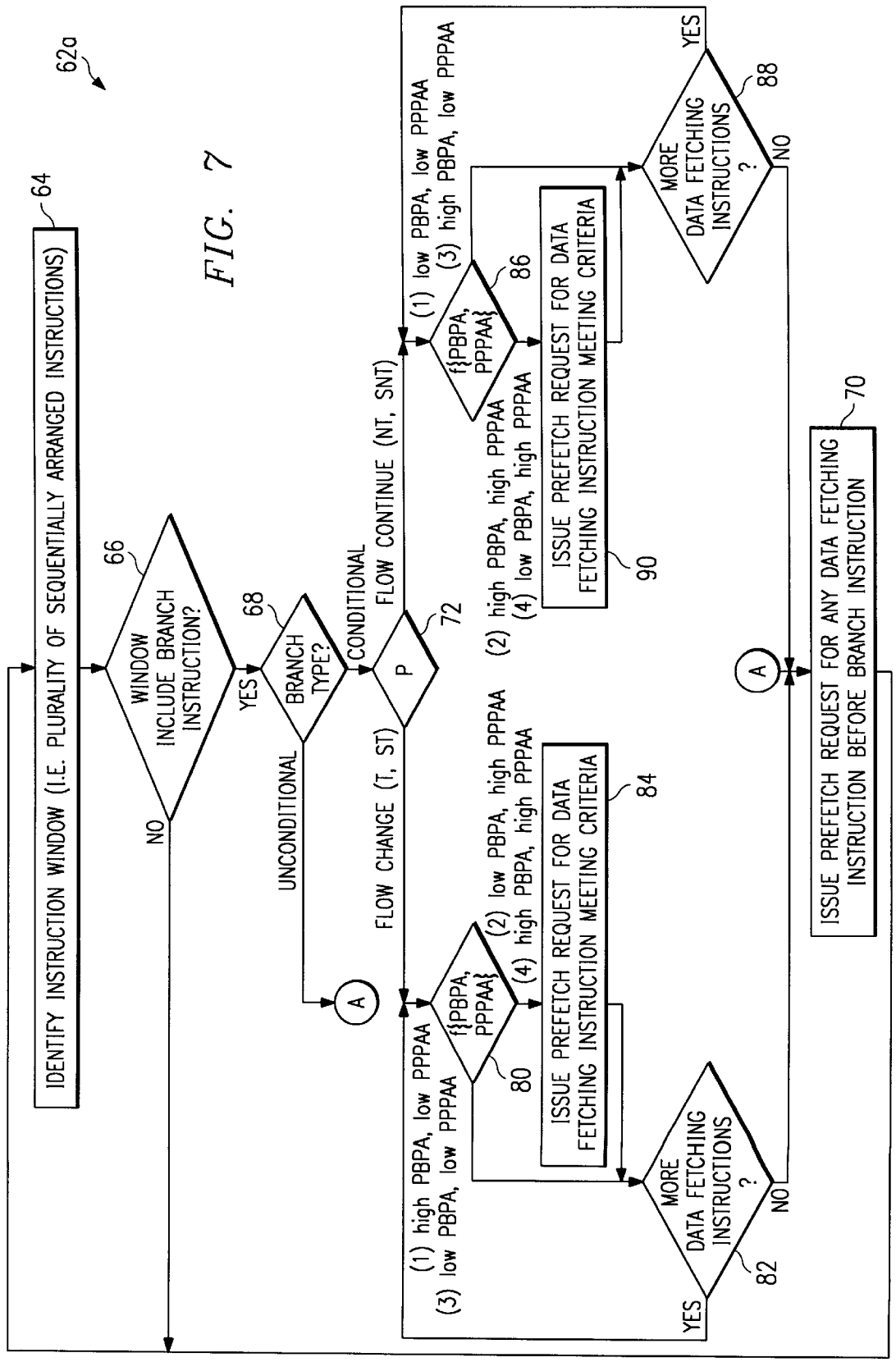
FIG. 7 illustrates a flow chart of a second method embodiment for the circuits of FIG. 4, where the second method embodiment issues prefetch requests for data fetching instructions based on a function combining a confidence measure of the branch prediction and a confidence measure of the predicted target data address.

FIG. 7 illustrates a modification to the flowchart for the method of FIG. 5. In general, FIG. 7 includes each of the same steps as method 62 of FIG. 5 through step 72 and, therefore, the reader is referred to the above discussion for an understanding of those steps. As appreciated below, the modifications cause prefetch request issuance to based on the considerations set forth in FIG. 5, but further in view of one of the desirability values introduced above in connection with entry 56$_1$ of FIG. 3. Particularly, for each of the step substitutions, the desirability value PPPAA is further considered as a condition for directing the flow of the method as better appreciated below.

Step 80, like step 74 of FIG. 5, evaluates the likely accuracy of the prediction used in step 72. Therefore, the reader is referred to the earlier discussion of step 74 for additional details as to that evaluation. In addition, however, step 80 also evaluates the relative value of PPPAA. More specifically, recall from FIG. 3 that each entry in LTB 56 in the preferred embodiment includes a PPPAA value, which recall further indicates a past predicted prefetch address accuracy measure for past incidents of the corresponding data fetching instruction. In other words, PPPAA is effectively a confidence measure of whether the target data address indicated by the PREDICTION POINTER is accurate. Thus, the higher the value of PPPAA, the higher the confidence in the prediction by the PREDICTION POINTER. Given the availability of PPPAA, step 74a combines the values of PBPA and PPPAA in some type of function, where the particular function may be ascertained by one skilled in the art given the current teachings. For example, FIG. 7 illustrates four potential findings of step 80 given a combination of PBPA and PPPAA, that is, either: (1) a relatively high PBPA and a relatively low PPPAA; (2) a relatively low PBPA and a relatively high PPPAA; (3) a relatively low PBPA and a relatively low PPPAA; and (4) a relatively high PBPA and a relatively high PPPAA. Note that the first two possibilities yield the method flow shown in FIG. 7, while the latter two may be adjusted based on considerations to one skilled in the art given the particular implementation. In any event, for the present embodiment step 80 directs the method to step 82 in response to the function finding either condition (1) or (3) above, and step 80 directs the method to step 84 in response to the function finding either condition (2) or (4) above. These alternatives should be appreciated by way of some examples discussed below. Additionally, before proceeding, note also that the function of step 80 is evaluated for each data fetching instruction following the conditional branch instruction in the instruction window. Thus, the flow for one such data fetching instruction in an instruction window may differ from that of another.

When reaching step 82 from step 80, it is effectively determined that a prefetch request is not desired for the data fetching instruction at issue. For example, returning to FIG. 6b, suppose that PBPA for the conditional branch instruction is 80 percent, and that PPPAA for data fetching instruction 5 is 20 percent, and that the relative basis of comparison for each percentage is 50 percent. Thus, PBPA is relatively high (i.e., 80 percent is greater than 50 percent), and with respect to data fetching instruction 5 its PPPAA value of 20 percent is relatively low. Thus, step 80 directs flow to step 82. Therefore, note that three conditions have been met: (1) program flow is predicted to change as indicated by P; (2) P is likely to be accurate because PBPA is 80 percent; and (3) a prefetch operation is likely to be undesirable because the PREDICTION POINTER is likely to be inaccurate because PPPAA is 20 percent. Thus, a prefetch request is not desired for data fetching instruction 5 and none is issued. Instead, step 82 determines whether there is another data fetching instruction in the instruction window following the current data fetching instruction 5. In the current example, the answer is affirmative due to data fetching instruction 6. Therefore, method 62a returns to step 80. On the other hand, if no additional data fetching instruction were to exist after the current data fetching instruction in the instruction window, then the method continues to step 70. As described above, step 70 then issues a prefetch request for any data fetching instruction which is before the conditional branch instruction in the instruction window.

Given the above, step 80 is again reached but this time with respect to data fetching instruction 6 from FIG. 6b. In this instance, again, again PBPA for the conditional branch instruction is 80 percent, but assume now that PPPAA for data fetching instruction 6 is 90 percent and again assume that the relative basis of comparison for each percentage is 50 percent Thus, the PBPA at issue is the same for all data fetching instructions which follow the conditional branch instruction in the instruction window and, therefore, it is relatively high (i.e., 80 percent is greater than 50 percent). Therefore, in combination with the PPPAA value of 80 percent of data fetching instruction 6, step 80 directs flow to step 84. Therefore, note that three conditions have been met: (1) program flow is predicted to change as indicated by P; (2) P is likely to be accurate because PBPA is 80 percent; and (3) a prefetch operation is likely to be desirable because the PREDICTION POINTER is likely to be accurate because PPPAA value is 90 percent. Thus, a prefetch request is desired for data fetching instruction 6 in step 84, that is, step 84 issues a prefetch request for the current data fetching instruction which met the criteria in step 80 in order to reach step 84. Lastly, note that after step 84 is complete, method 62a continues to step 82 which, as described above, either returns control to step 80 if there is still another data fetching instruction in the current instruction window to be considered or, alternatively directs the flow to step 70 to issue a prefetch request for any data fetching instruction(s) which is before the conditional branch instruction in the instruction window.

Given the description of step 80, above, note that step 86 may be reached after step 72 to evaluate one or more data fetching instructions when the prediction P is that the program flow will continue to additional instructions in the instruction window after the conditional branch instruction. Moreover, step 86 operates in much the same fashion as step 80 to combine PBPA and PPPAA using some function, with the difference being the combinations of the resulting functions cause different results because step 86 is reached in response to step 72 finding a P value predicting no change in program flow whereas step 80 was reached in response to step 72 finding a P value predicting a change in program flow. Therefore, given its comparable operation to step 80, looking to step 86 it again illustrates four potential findings given a combination of PBPA and PPPAA, that is, either: (1) a relatively low PBPA and a relatively low PPPAA; (2) a relatively high PBPA and a relatively high PPPAA; (3) a relatively high PBPA and a relatively low PPPAA; and (4) a relatively low PBPA and a relatively high PPPAA. Again, note that the first two possibilities yield the method flow shown in FIG. 7, while the latter two may be adjusted based on considerations to one skilled in the art given the particular implementation. In any event, for the present embodiment step 86 directs the method to step 88 in response to the function finding either condition (1) or (3) above, and step 86 directs the method to step 90 in response to the function finding either condition (2) or (4) above. These alternatives also are appreciated by way of some examples discussed below.

When reaching step 88 from step 86, it is effectively determined that a prefetch request is not desired for the data fetching instruction at issue. For example, returning to FIG. 6b, suppose that PBPA for the conditional branch instruction is 20 percent, and that PPPAA for data fetching instruction 5 is 10 percent, and that the relative basis of comparison for each percentage is 50 percent. Thus, PBPA is relatively low, and with respect to data fetching instruction 5 its PPPAA of 10 percent is relatively low. Thus, step 86 directs flow to step 88. Therefore, note that three conditions have been met: (1) program flow is predicted to not change as indicated by P; (2) P is likely to be inaccurate because PBPA is 20 percent; and (3) a prefetch operation is likely to be undesirable because the PREDICTION POINTER is likely to be inaccurate because PPPAA is 10 percent. Thus, a prefetch request is not desired for data fetching instruction 5 and none is issued. Instead, step 88, like step 82, determines whether there is another data fetching instruction in the instruction window following the current data fetching instruction 5. In the current example, the answer is affirmative due to data fetching instruction 6. Therefore, method 62a returns to step 86. On the other hand, if no additional data fetching instruction were to exist after the current data fetching instruction in the instruction window, then the method continues to step 70 to issue a prefetch request for any data fetching instruction which is before the conditional branch instruction in the instruction window.

Given the above, step 86 is again reached but this time with respect to data fetching instruction 6 from FIG. 6b. In this instance, again PBPA for the conditional branch instruction is 20 percent, but assume now that PPPAA for data fetching instruction 6 is 90 percent and again assume that the relative basis of comparison for each percentage is 50 percent. Thus, the PBPA at issue is the same for all data fetching instructions which follow the conditional branch instruction in the instruction window and, therefore, it is relatively low. Therefore, in combination with PPPAA of 90 percent for data fetching instruction 6, step 86 directs flow to step 90. Therefore, note that three conditions have been met: (1) program flow is predicted to not change as indicated by P; (2) P is likely to be inaccurate because PBPA is 20 percent; and (3) a prefetch operation is likely to be desirable because the PREDICTION POINTER is likely to be accurate because PPPAA is 90 percent. Thus, a prefetch request is desired for data fetching instruction 6 and is accomplished in step 90, that is, step 90 issues a prefetch request for the current data fetching instruction which met the criteria in step 86 in order to reach step 90. Lastly, note that after step 90 is complete, method 62a continues to step 88 which, as described above, either returns control to step 86 if there is still another data fetching instruction in the current instruction window to be considered or, alternatively directs the flow to step 70 to issue a prefetch request for any data fetching instruction(s) before the conditional branch instruction in the instruction window.

FIG. 8 illustrates a modification to the flowchart for the method of FIG. 7, with the only difference being that steps 80 and 86 from FIG. 7 are replaced in FIG. 8 with steps 80a and 86a, respectively, and the method of FIG. 8 is designated generally at 62c. Thus, provided the reader is familiar with the above discussion then they should likewise generally appreciate method 62c. Briefly introducing the contrast of FIGS. 7 and 8, note that steps 80a and 86a of FIG. 8 once again consider a function involving the PBPA value from BTB 41 and the PPPAA value from LTB 56, but note now that the function for both of those steps further considers the value of PPU also from LTB 56. This consideration is addressed below, with one skilled in the art appreciating its affects as well as still additional alternatives given the detailed variations provided above.

In FIG. 8, note now that step 82 is reached from step 80a again when it is effectively determined that a prefetch request is not desired for the data fetching instruction at issue. Here, however, this determination arises from the combination of four conditions, those being the values of P, PBPA, PPPAA, and PPU. Given these values, one skilled in the art may derive one or more functions for combining these values. For example, when P indicates control will change, then one combination for which step 80a would transfer flow to step 82 would be in response to a relatively high PBPA, a relatively high PPPAA, and a relatively high PPU. Still other variations of these three values may be ascertainable given various considerations. For example, another combination for which step 80a may transfer flow to step 82 may be in response to a relatively high PBPA, a relatively high PPPAA, and a relatively low PPU. In any event, and in contrast, note now that step 84 is reached from step 80a again when it is effectively determined that a prefetch request is desired for the data fetching instruction at issue given the combination of the four conditions P, PBPA, PPPAA, and PPU. Given these values, one skilled in the art may again derive one or more functions for combining these values. For example, first P indicates control will change given how step 80a is reached from step 72. Thus, one combination for which step 80a would transfer flow to step 84 would be in response to a relatively low PBPA, a relatively low PPPAA, and a relatively low PPU. Still other variations of these three values also may be ascertainable given various considerations. For example, another combination for which step 80a may transfer flow to step 84 would be in response to a relatively low PBPA, a relatively low PPPAA, and a very high PPU.

Given the description of step 80a, above, note now that step 86a also may be reached by step 72 to evaluate one or more data fetching instructions, but here where the prediction P is that the program flow will continue to additional instructions in the instruction window after the conditional branch instruction. Moreover, step 86a operates in much the same fashion as step 80a to combine PBPA, PPPAA, and PPU using some function, with the difference being the combinations of the resulting function causes different results because step 86a is reached in response to step 72 finding a P value predicting no change in program flow whereas step 80a was reached in response to step 72 finding a P value predicting a change in program flow. Therefore, given its comparable operation to step 80a, note that step 88 is reached from step 86a again when it is effectively determined that a prefetch request is not desired for the data fetching instruction at issue. Given the description of step 80, above, note now that step 86a also may be reached by 72 to evaluate one or more data fetching instructions, but here where the prediction P is that the program flow will continue to additional instructions in the instruction window after the conditional branch instruction. Moreover, step 86a operates in much the same fashion as step 80a to combine PBPA, PPPAA, and PPU using some function, with the difference being the combinations of the resulting functions cause different results because step 86a is reached in response to step 72 finding a P value predicting no change in program flow whereas step 80a was reached in response to step 72 finding a P value predicting a change in program flow. Therefore, given its comparable operation to step 80a, and given the availability of PBPA, PPPAA, and PPU, again one skilled in the art may again derive one or more functions for combining these values. For example, since P indicates control will not change, then combination for which step 86a would transfer flow to step 88 would be in response to a relatively low PBPA, a relatively low PPPAA, and a relatively low PPU. Still other variations of these three values may be ascertainable given various considerations. For example, another combination for which step 86a may transfer flow to step 88 would be in response to a relatively low PBPA, a relatively high PPPAA, and a relatively low PPU. In any event, and in contrast, note now that step 90 is reached from step 86a again when it is effectively determined that a prefetch request is desired for the data fetching instruction at issue given the combination of the four conditions P, PBPA, PPPAA, and PPU. Given these values, one skilled in the art may again derive one or more functions for combining these values. For example, since P indicates control will not change given how step 86a is reached from step 72, then one combination for which step 86a would transfer flow to step 90 would be in response to a value of a relatively high PBPA, a relatively high PPPAA, and a relatively high PPU. Still other variations of these three values also may be ascertainable given various considerations. For example, another combination in which step 86a may transfer flow to step 90 would be in response to a value of a relatively high PBPA, a relatively high PPPAA, and a very low PPU.

Given the above, one skilled in the art will appreciate how the present embodiments may provide numerous benefits by issuing prefetch requests in response to a combination of considerations. Additionally, various different considerations either alone or in combination may be considered, as provided by the above examples. Indeed, numerous examples of variations of the present embodiments have been provided which illustrate benefits of those embodiments as well as the flexibility of the inventive scope. Indeed, note that one skilled in the art may ascertain still additional examples given the teachings of this document. For example, note that the function combining PBPA and PPPAA of FIG. 7 could be modified to instead combine PBPA and PPU, that is, by eliminating PPPAA from consideration. As another example, while the methods described above apply to a single branch instruction within an instruction window, they may be expanded to further enhance prefetch operations with respect to multiple branch instructions in the same instruction window. As yet another example, while a general microprocessor architecture is provided in FIG. 1, various microprocessor architectures may benefit from the current teachings. Consequently, while the present embodiments have been described in detail, various substitutions, modifications or alterations could be made to the descriptions set forth above without departing from the inventive scope which is defined by the following claims.

We claim:

1. A method of operating a microprocessor, comprising the steps of:
   first, receiving a plurality of instructions arranged in a sequence from a first instruction through a last instruction;
   second, identifying a branch instruction as one of the plurality of instructions, wherein the branch instruction has a target instruction address;
   third, determining for the branch instruction:
      a prediction value indicating whether or not program flow should pass to the target instruction address; and
      an accuracy measure indicating accuracy of past ones of the prediction value;
   fourth, identifying a data fetching instruction following the branch instruction in the plurality of instructions; and
   fifth, issuing a prefetch request for the data fetching instruction in response to the accuracy measure.

2. The method of claim 1:
   and further comprising, prior to the fifth step, determining for the data fetching instruction a desirability value indicating whether a prefetch request for the data fetching instruction is desirable based on past incidents of the data fetching instruction; and
   wherein the fifth step of issuing a prefetch request for the data fetching instruction in response to the accuracy measure further comprises issuing a prefetch request for the data fetching instruction in response to the accuracy measure and the desirability value.

3. The method of claim 2 wherein the step of determining for the data fetching instruction a desirability value comprises:
   determining a predicted target data address for the data fetching instruction; and
   determining a value for indicating a past predicted accuracy of the corresponding predicted target data address.

4. The method of claim 3:
   wherein the value for indicating a past predicted accuracy comprises a counter;
   wherein the counter advances in a first direction in response to an accurate prediction by the corresponding predicted target data address; and
   wherein the counter advances in a second direction opposite the first direction in response to an inaccurate prediction by the corresponding predicted target data address.

5. The method of claim 3:
   wherein the value for indicating a past predicted accuracy comprises a series of binary indicators; and
   wherein each of the binary indicators in the series reflects accuracy of the predicted target data address over a corresponding series of past incidents of the data fetching instruction corresponding to the entry.

6. The method of claim 2:
   wherein the microprocessor has a memory system; and
   wherein the step of determining for the data fetching instruction a desirability value comprises:
      determining a predicted target data address for the data fetching instruction; and
      determining a past prefetch usefulness value representative of whether target data at the predicted target data address was stored in the memory system in response to a prior past incident of the data fetching instruction.

7. The method of claim 6:
   wherein the past prefetch usefulness value comprises a counter;
   wherein the counter advances in a first direction in response to detecting that the target data at the predicted target data address was not stored in the memory system in response to a prior past incident of the data fetching instruction; and
   wherein the counter advances in a second direction opposite the first direction in response to detecting that the target data at the predicted target data address was stored in the memory system in response to a prior past incident of the data fetching instruction.

8. The method of claim 6:
   wherein the past prefetch usefulness value comprises a series of binary indicators; and
   wherein each of the binary indicators in the series reflects whether the target data at the predicted target data address was stored in the memory system in response to a prior past incident of the data fetching instruction.

9. The method of claim 2 wherein the fifth step of issuing a prefetch request for the data fetching instruction in response to the accuracy measure and the desirability value comprises not issuing a prefetch request in response to the prediction value indicating that the program flow should pass to the target instruction address, the accuracy measure indicating a relatively high accuracy of past ones of the prediction value, and a relatively low value of the desirability value.

10. The method of claim 2 wherein the fifth step of issuing a prefetch request for the data fetching instruction in response to the accuracy measure and the desirability value comprises issuing a prefetch request in response to the prediction value indicating that the program flow should not pass to the target instruction address, the accuracy measure indicating a relatively high accuracy of past ones of the prediction value, and a relatively high value of the desirability value.

11. The method of claim 2:
wherein the fifth step of issuing a prefetch request for the data fetching instruction in response to the accuracy measure and the desirability value comprises not issuing a prefetch request in response to the prediction value indicating that the program flow should pass to the target instruction address, the accuracy measure indicating a relatively high accuracy of past ones of the prediction value, and a relatively low value of the desirability value; and
wherein the fifth step of issuing a prefetch request for the data fetching instruction in response to the accuracy measure and the desirability value comprises issuing a prefetch request in response to the prediction value indicating that the program flow should not pass to the target instruction address, the accuracy measure indicating a relatively high accuracy of past ones of the prediction value, and a relatively high value of the desirability value.

12. The method of claim 1:
wherein the accuracy measure indicating accuracy of past ones of the prediction value comprises a counter;
wherein the counter advances in a first direction in response to an accurate prediction by the corresponding prediction value;
wherein the counter advances in a second direction opposite the first direction in response to an inaccurate prediction by the corresponding prediction value.

13. The method of claim 1:
wherein the accuracy measure indicating accuracy of past ones of the prediction value comprises a series of binary indicators; and
wherein each of the binary indicators in the series reflects whether the prediction value was accurate in response to a prior past incident of the branch instruction.

14. The method of claim 1 wherein the fifth step of issuing a prefetch request for the data fetching instruction in response to the accuracy measure comprises not issuing a prefetch request in response to the prediction value indicating that the program flow should pass to the target instruction address and the accuracy measure indicating a relatively high accuracy of past ones of the prediction value.

15. The method of claim 1 wherein the fifth step of issuing a prefetch request for the data fetching instruction in response to the accuracy measure comprises issuing a prefetch request in response to the prediction value indicating that the program flow should not pass to the target instruction address and the accuracy measure indicating a relatively high accuracy of past ones of the prediction value.

16. The method of claim 1 and further comprising, prior to the fifth step, the steps of:
determining for the data fetching instruction a first and second desirability value, wherein each of the first and second desirability values indicates whether a prefetch request for the data fetching instruction is desirable based on past incidents of the data fetching instruction; and
wherein the fifth step of issuing a prefetch request for the data fetching instruction in response to the accuracy measure further comprises issuing a prefetch request for the data fetching instruction in response to the accuracy measure and the first and second desirability values.

17. The method of claim 16:
wherein the microprocessor has a memory system;
wherein the step of determining for the data fetching instruction a first desirability value comprises:
determining a predicted target data address for the data fetching instruction; and
determining a value for indicating a past predicted accuracy of the corresponding predicted target data address; and
wherein the step of determining for the data fetching instruction a second desirability value comprises:
determining a predicted target data address for the data fetching instruction; and
determining a past prefetch usefulness value representative of whether target data at the predicted target data address was stored in the memory system in response to a prior past incident of the data fetching instruction.

18. The method of claim 1:
wherein the fifth step of issuing a prefetch request for the data fetching instruction in response to the accuracy measure comprises not issuing a prefetch request in response to the prediction value indicating that the program flow should pass to the target instruction address and the accuracy measure indicating a relatively high accuracy of past ones of the prediction value; and
wherein the fifth step of issuing a prefetch request for the data fetching instruction in response to the accuracy measure comprises issuing a prefetch request in response to the prediction value indicating that the program flow should not pass to the target instruction address and the accuracy measure indicating a relatively high accuracy of past ones of the prediction value.

19. A microprocessor, comprising:
an instruction pipeline comprising a preliminary stage, a plurality of stages following the preliminary stage, and an execution stage following the plurality of stages, wherein at least one of the stages is for receiving a plurality of instructions arranged in a sequence from a first instruction through a last instruction;
circuitry for identifying a branch instruction as one of the plurality of instructions, wherein the branch instruction has a target instruction address;
circuitry for determining for the branch instruction:
a prediction value indicating whether or not program flow should pass to the target instruction address; and
an accuracy measure indicating accuracy of past ones of the prediction value;
circuitry for identifying a data fetching instruction following the branch instruction in the plurality of instructions; and
circuitry for issuing a prefetch request for the data fetching instruction in response to the accuracy measure.

20. The microprocessor of claim 19:
and further comprising circuitry for determining for the data fetching instruction a desirability value indicating whether a prefetch request for the data fetching instruction is desirable based on past incidents of the data fetching instruction; and wherein the circuitry for issuing a prefetch request for the data fetching instruction in response to the accuracy measure further comprises circuitry for issuing a prefetch request for the data fetching instruction in response to the accuracy measure and the desirability value.

21. The microprocessor of claim 20 wherein the circuitry for determining for the data fetching instruction a desirability value comprises:

circuitry for determining a predicted target data address for the data fetching instruction; and circuitry for determining a value for indicating a past predicted accuracy of the corresponding predicted target data address.

22. The microprocessor of claim 21:

wherein the value for indicating a past predicted accuracy comprises a counter;

wherein the counter advances in a first direction in response to an accurate prediction by the corresponding predicted target data address; and wherein the counter advances in a second direction opposite the first direction in response to an inaccurate prediction by the corresponding predicted target data address.

23. The microprocessor of claim 21:

wherein the value for indicating a past predicted accuracy comprises a series of binary indicators; and wherein each of the binary indicators in the series reflects accuracy of the predicted target data address over a corresponding series of past incidents of the data fetching instruction corresponding to the entry.

24. The microprocessor of claim 20:

wherein the microprocessor further comprises a memory system; and wherein the circuitry for determining for the data fetching instruction a desirability value comprises:

circuitry for determining a predicted target data address for the data fetching instruction; and circuitry for determining a past prefetch usefulness value representative of whether target data at the predicted target data address was stored in the memory system in response to a prior past incident of the data fetching instruction.

25. The microprocessor of claim 24:

wherein the past prefetch usefulness value comprises a counter;

wherein the counter advances in a first direction in response to detecting that the target data at the predicted target data address was not stored in the memory system in response to a prior past incident of the data fetching instruction; and wherein the counter advances in a second direction opposite the first direction in response to detecting that the target data at the predicted target data address was stored in the memory system in response to a prior past incident of the data fetching instruction.

26. The microprocessor of claim 24:

wherein the past prefetch usefulness value comprises a series of binary indicators; and wherein each of the binary indicators in the series reflects whether the target data at the predicted target data address was stored in the memory system in response to a prior past incident of the data fetching instruction.

27. The microprocessor of claim 20 wherein the circuitry for issuing a prefetch request for the data fetching instruction in response to the accuracy measure and the desirability value comprises circuitry for not issuing a prefetch request in response to the prediction value indicating that the program flow should pass to the target instruction address, the accuracy measure indicating a relatively high accuracy of past ones of the prediction value, and a relatively low value of the desirability value.

28. The microprocessor of claim 20 wherein the circuitry for issuing a prefetch request for the data fetching instruction in response to the accuracy measure and the desirability value comprises circuitry for issuing a prefetch request in response to the prediction value indicating that the program flow should not pass to the target instruction address, the accuracy measure indicating a relatively high accuracy of past ones of the prediction value, and a relatively high value of the desirability value.

29. The microprocessor of claim 20:

wherein the circuitry for issuing a prefetch request for the data fetching instruction in response to the accuracy measure and the desirability value comprises circuitry for not issuing a prefetch request in response to the prediction value indicating that the program flow should pass to the target instruction address, the accuracy measure indicating a relatively high accuracy of past ones of the prediction value, and a relatively low value of the desirability value; and wherein the circuitry for issuing a prefetch request for the data fetching instruction in response to the accuracy measure and the desirability value comprises circuitry for issuing a prefetch request in response to the prediction value indicating that the program flow should not pass to the target instruction address, the accuracy measure indicating a relatively high accuracy of past ones of the prediction value, and a relatively high value of the desirability value.

30. The microprocessor of claim 19:

wherein the accuracy measure indicating accuracy of past ones of the prediction value comprises a counter;

wherein the counter advances in a first direction in response to an accurate prediction by the corresponding prediction value;

wherein the counter advances in a second direction opposite the first direction in response to an inaccurate prediction by the corresponding prediction value.

31. The microprocessor of claim 19:

wherein the accuracy measure indicating accuracy of past ones of the prediction value comprises a series of binary indicators; and wherein each of the binary indicators in the series reflects whether the prediction value was accurate in response to a prior past incident of the branch instruction.

32. The microprocessor of claim 19 wherein the circuitry for issuing a prefetch request for the data fetching instruction in response to the accuracy measure comprises circuitry for not issuing a prefetch request in response to the prediction value indicating that the program flow should pass to the target instruction address and the accuracy measure indicating a relatively high accuracy of past ones of the prediction value.

33. The microprocessor of claim 19 wherein the circuitry for issuing a prefetch request for the data fetching instruction in response to the accuracy measure comprises circuitry for issuing a prefetch request in response to the prediction value indicating that the program flow should not pass to the target instruction address and the accuracy measure indicating a relatively high accuracy of past ones of the prediction value.

34. The microprocessor of claim 19 and further comprising:
- circuitry for determining for the data fetching instruction a first and second desirability value, wherein each of the first and second desirability values indicates whether a prefetch request for the data fetching instruction is desirable based on past incidents of the data fetching instruction; and
- wherein the circuitry for issuing a prefetch request for the data fetching instruction in response to the accuracy measure further comprises circuitry for issuing a prefetch request for the data fetching instruction in response to the accuracy measure and the first and second desirability values.

35. The microprocessor of claim 34:
- wherein the microprocessor further comprises a memory system;
- wherein the circuitry for determining for the data fetching instruction a first desirability value comprises:
  - circuitry for determining a predicted target data address for the data fetching instruction; and
  - circuitry for determining a value for indicating a past predicted accuracy of the corresponding predicted target data address; and
- wherein the circuitry for determining for the data fetching instruction a second desirability value comprises:
  - circuitry for determining a predicted target data address for the data fetching instruction; and
  - circuitry for determining a past prefetch usefulness value representative of whether target data at the predicted target data address was stored in the memory system in response to a prior past incident of the data fetching instruction.

36. The microprocessor of claim 19:
- wherein the circuitry for issuing a prefetch request for the data fetching instruction in response to the accuracy measure comprises circuitry for not issuing a prefetch request in response to the prediction value indicating that the program flow should pass to the target instruction address and the accuracy measure indicating a relatively high accuracy of past ones of the prediction value; and
- wherein the circuitry for issuing a prefetch request for the data fetching instruction in response to the accuracy measure comprises circuitry for issuing a prefetch request in response to the prediction value indicating that the program flow should not pass to the target instruction address and the accuracy measure indicating a relatively high accuracy of past ones of the prediction value.

* * * * *